United States Patent
Nelson et al.

(10) Patent No.: US 11,543,143 B2
(45) Date of Patent: Jan. 3, 2023

(54) DEVICES AND METHODS FOR INTERACTING WITH AN HVAC CONTROLLER

(71) Applicant: Ademco Inc., Golden Valley, MN (US)

(72) Inventors: Jay Nelson, Eden Prairie, MN (US);
Hari Thiruvengada, Plymouth, MN (US); Preston Gilmer, Delano, MN (US); Thomas Gessner, Plymouth, MN (US); Martin Adamek, Pelhrimov (CZ); Martin Skala, Olomouc (CZ); Juraj Buno, Stara Tura (SK); Soumitri Kolavennu, Blaine, MN (US); Max Peterschmidt, Minneapolis, MN (US); Libor Horky, Brno (CZ); Cary Leen, Hammond, WI (US); Heidi Finch, Champlin, MN (US)

(73) Assignee: Ademco Inc., Golden Valley, MN (US)

( * ) Notice: Subject to any disclaimer, the term of this patent is extended or adjusted under 35 U.S.C. 154(b) by 429 days.

(21) Appl. No.: 16/860,942

(22) Filed: Apr. 28, 2020

(65) Prior Publication Data

US 2020/0256575 A1 Aug. 13, 2020

Related U.S. Application Data

(60) Division of application No. 16/043,016, filed on Jul. 23, 2018, now Pat. No. 10,670,289, which is a
(Continued)

(51) Int. Cl.
*F24F 11/30* (2018.01)
*G05D 23/19* (2006.01)
(Continued)

(52) U.S. Cl.
CPC .......... *F24F 11/30* (2018.01); *F24D 19/1084* (2013.01); *G05D 23/1902* (2013.01);
(Continued)

(58) Field of Classification Search
CPC ....... F24D 19/1084; F24F 11/30; F24F 11/52; F24F 11/56; F24F 11/58; F24F 2110/00;
(Continued)

(56) References Cited

U.S. PATENT DOCUMENTS

| 1,598,397 A | 8/1926 | Senise |
| 3,086,385 A | 4/1963 | Branchereau et al. |

(Continued)

FOREIGN PATENT DOCUMENTS

| CN | 201225714 | 4/2009 |
| CN | 101947788 | 1/2011 |

(Continued)

OTHER PUBLICATIONS

"T² RERC Rehabilitation Engineering Research Center on Technology Transfer, Accessinle Thermostat" 40 pages, downloaded Jun. 6, 2013.
(Continued)

*Primary Examiner* — Jonathan Bradford
(74) *Attorney, Agent, or Firm* — Fredrikson & Byron, P.A.

(57) ABSTRACT

An HVAC controller controlled in response to a natural language audio message that is not recognizable by the HVAC controller as a command, where the natural language audio message is translated into a command recognizable by the HVAC controller. The HVAC controller may be a thermostat and may include a housing that at least partially houses a control module, a microphone, a speaker, a display, and a voice recognition module. The voice recognition module recognizes a predetermined audible trigger from a
(Continued)

recorded voice message or streamed voice message, and in response, provide one or more audio clips via the speaker and/or video clips via the display to assist users in operating the thermostat. A user may communicate with the thermostat via the thermostat and/or a remote device.

7 Claims, 22 Drawing Sheets

Related U.S. Application Data continuation of application No. 14/463,712, filed on Aug. 20, 2014, now Pat. No. 10,047,970.

(60) Provisional application No. 61/868,441, filed on Aug. 21, 2013.

(51) Int. Cl.
| | | |
|---|---|---|
| *G10L 15/22* | (2006.01) | |
| *F24D 19/10* | (2006.01) | |
| *F24F 11/56* | (2018.01) | |
| *F24F 11/52* | (2018.01) | |
| *F24F 11/58* | (2018.01) | |
| *F24F 110/00* | (2018.01) | |
| *F24F 130/40* | (2018.01) | |
| *G06F 3/16* | (2006.01) | |

(52) U.S. Cl.
CPC ............... *G10L 15/22* (2013.01); *F24F 11/52* (2018.01); *F24F 11/56* (2018.01); *F24F 11/58* (2018.01); *F24F 2110/00* (2018.01); *F24F 2130/40* (2018.01); *G06F 3/167* (2013.01); *Y02B 10/40* (2013.01)

(58) Field of Classification Search
CPC ... F24F 2130/40; G05D 23/1902; G06F 3/167
See application file for complete search history.

(56) References Cited

U.S. PATENT DOCUMENTS

| | | |
|---|---|---|
| 3,350,666 A | 10/1967 | Ziegler, Jr. |
| 3,413,079 A | 11/1968 | Rich, Jr. |
| 3,630,742 A | 12/1971 | Crawford et al. |
| 4,223,831 A | 9/1980 | Szarka |
| 4,253,153 A | 2/1981 | Bitterli et al. |
| 4,340,797 A | 7/1982 | Takano et al. |
| 4,353,502 A | 10/1982 | Myers |
| 4,381,549 A | 4/1983 | Stamp, Jr. et al. |
| 4,598,397 A | 7/1986 | Nelson et al. |
| 4,790,143 A | 12/1988 | Hanson |
| 5,065,813 A | 11/1991 | Berkeley et al. |
| 5,086,385 A | 2/1992 | Launey et al. |
| 5,123,252 A | 6/1992 | Hanson |
| 5,161,606 A | 11/1992 | Berkeley et al. |
| 5,284,024 A | 2/1994 | Hanson et al. |
| 5,345,226 A | 9/1994 | Rice, Jr. et al. |
| 5,395,042 A | 3/1995 | Riley et al. |
| 5,422,824 A | 6/1995 | Biehler et al. |
| 5,481,714 A | 1/1996 | Pipkin et al. |
| 5,539,822 A | 7/1996 | Lett |
| 5,553,064 A | 9/1996 | Paff et al. |
| 5,596,507 A | 1/1997 | Jones et al. |
| 5,682,329 A | 10/1997 | Seem et al. |
| 5,690,277 A | 11/1997 | Flood |
| 5,761,606 A | 6/1998 | Wolzien |
| 5,794,205 A | 8/1998 | Walters et al. |
| 5,818,438 A | 10/1998 | Howe et al. |
| 5,892,508 A | 4/1999 | Howe et al. |
| 5,903,816 A | 5/1999 | Broadwin et al. |
| 5,929,850 A | 7/1999 | Broadwin et al. |
| 5,940,118 A | 8/1999 | Van Schyndel |
| 5,961,603 A | 10/1999 | Kunkel et al. |
| 5,982,445 A | 11/1999 | Eyer et al. |
| 5,995,092 A | 11/1999 | Yuen et al. |
| 6,002,394 A | 12/1999 | Schein et al. |
| 6,005,561 A | 12/1999 | Hawkins et al. |
| 6,006,256 A | 12/1999 | Zdepski et al. |
| 6,009,392 A | 12/1999 | Kanevsky et al. |
| 6,083,270 A | 7/2000 | Scott |
| 6,172,677 B1 | 1/2001 | Stautner et al. |
| 6,385,510 B1 | 5/2002 | Hoog et al. |
| 6,413,079 B1 | 7/2002 | Lyons et al. |
| 6,477,493 B1 | 11/2002 | Brooks et al. |
| 6,477,508 B1 | 11/2002 | Lazar et al. |
| 6,526,335 B1 | 2/2003 | Treyz et al. |
| 6,584,439 B1 | 6/2003 | Geilhufe et al. |
| 6,584,613 B1 | 6/2003 | Dunn et al. |
| 6,608,560 B2 | 8/2003 | Abrams |
| 6,624,750 B1 | 9/2003 | Marman et al. |
| 6,813,221 B1 | 11/2004 | Barr |
| 6,988,070 B2 | 1/2006 | Kawasaki et al. |
| 7,042,349 B2 | 5/2006 | Bergman et al. |
| 7,108,194 B1 | 9/2006 | Hankins, II |
| 7,113,090 B1 | 9/2006 | Saylor et al. |
| 7,119,658 B2 | 10/2006 | Stilp |
| 7,139,716 B1 | 11/2006 | Gaziz |
| 7,146,253 B2 | 12/2006 | Hoog et al. |
| 7,162,253 B2 | 1/2007 | Vare et al. |
| 7,183,907 B2 | 2/2007 | Simon et al. |
| 7,184,960 B2 | 2/2007 | Deisher et al. |
| 7,280,643 B2 | 10/2007 | Howard et al. |
| 7,349,758 B2 | 3/2008 | Miro et al. |
| 7,397,363 B2 | 7/2008 | Joao |
| 7,436,292 B2 | 10/2008 | Rourke et al. |
| 7,436,296 B2 | 10/2008 | Rourke et al. |
| 7,451,937 B2 | 11/2008 | Flood et al. |
| 7,454,269 B1 | 11/2008 | Dushane et al. |
| 7,464,035 B2 | 12/2008 | Funk et al. |
| 7,522,063 B2 | 4/2009 | Ehlers |
| 7,634,504 B2 | 12/2009 | Amundson |
| 7,675,402 B2 | 3/2010 | Lee et al. |
| 7,720,683 B1 | 5/2010 | Vermeulen et al. |
| 7,747,446 B2 | 6/2010 | Blass et al. |
| 7,752,047 B2 | 7/2010 | Morris |
| 7,890,334 B2 | 2/2011 | Park et al. |
| 7,899,912 B2 | 3/2011 | Bisdikian et al. |
| 7,957,974 B2 | 6/2011 | Cho et al. |
| 8,013,730 B2 | 9/2011 | Oh et al. |
| 8,019,567 B2 | 9/2011 | Steinberg et al. |
| 8,042,048 B2 | 10/2011 | Wilson et al. |
| 8,068,881 B2 | 11/2011 | Schrager |
| 8,078,472 B2 | 12/2011 | Resch et al. |
| 8,099,289 B2 | 1/2012 | Mozer et al. |
| 8,107,989 B2 | 1/2012 | Budampati et al. |
| 8,155,767 B2 | 4/2012 | ElMankabady et al. |
| 8,175,884 B1 | 5/2012 | Morris |
| 8,234,119 B2 | 7/2012 | Dhawan et al. |
| 8,239,922 B2 | 8/2012 | Sullivan et al. |
| 8,340,975 B1 | 12/2012 | Rosenberg |
| 8,350,666 B2 | 1/2013 | Kore |
| 8,411,590 B2 | 4/2013 | Wang |
| 8,509,954 B2 | 8/2013 | Imes et al. |
| 8,630,742 B1 | 1/2014 | Stefanski |
| 8,699,944 B2 | 4/2014 | Malamud et al. |
| 8,918,219 B2 | 12/2014 | Sloo et al. |
| 8,976,937 B2 | 3/2015 | Shapiro et al. |
| 9,043,210 B1 | 5/2015 | Adcock et al. |
| 9,240,182 B2 | 1/2016 | Lee et al. |
| 9,354,310 B2 | 5/2016 | Visser et al. |
| 10,030,878 B2 | 7/2018 | Nemcek et al. |
| 10,145,579 B2 | 12/2018 | Stoner et al. |
| 2002/0034956 A1 | 3/2002 | Mekuria |
| 2002/0123896 A1 | 9/2002 | Diez |
| 2002/0193989 A1 | 12/2002 | Geilhufe et al. |
| 2003/0034898 A1 | 2/2003 | Shamoon et al. |
| 2003/0036909 A1 | 2/2003 | Kato |
| 2003/0088642 A1 | 5/2003 | Price et al. |
| 2003/0117486 A1 | 6/2003 | Ferren et al. |
| 2003/0118200 A1 | 6/2003 | Beaucoup et al. |
| 2003/0177012 A1 | 9/2003 | Drennan |

(56) References Cited

U.S. PATENT DOCUMENTS

| | | |
|---|---|---|
| 2003/0233432 A1 | 12/2003 | Davis et al. |
| 2004/0019489 A1 | 1/2004 | Funk et al. |
| 2004/0215750 A1 | 10/2004 | Stilp |
| 2005/0002535 A1 | 1/2005 | Liu et al. |
| 2006/0161270 A1 | 7/2006 | Luskin et al. |
| 2006/0180676 A1 | 8/2006 | Park et al. |
| 2006/0282649 A1 | 12/2006 | Malamud et al. |
| 2007/0012793 A1 | 1/2007 | Flood et al. |
| 2007/0135969 A1 | 6/2007 | Curl |
| 2007/0192486 A1 | 8/2007 | Wilson et al. |
| 2007/0204228 A1 | 8/2007 | Minear |
| 2007/0247301 A1 | 10/2007 | Browne |
| 2007/0263600 A1 | 11/2007 | Sutardja et al. |
| 2007/0286181 A1 | 12/2007 | Bushmitch et al. |
| 2008/0037727 A1 | 2/2008 | Sivertsen et al. |
| 2008/0072314 A1 | 3/2008 | Frenette |
| 2008/0091432 A1 | 4/2008 | Dalton et al. |
| 2008/0150679 A1 | 6/2008 | Bloomfield |
| 2008/0175261 A1 | 7/2008 | Wang |
| 2008/0221714 A1 | 9/2008 | Schoettle |
| 2008/0233983 A1 | 9/2008 | Park et al. |
| 2009/0064295 A1 | 3/2009 | Budampati et al. |
| 2009/0086940 A1 | 4/2009 | Diethorn et al. |
| 2009/0059786 A1 | 5/2009 | Budampati et al. |
| 2009/0134993 A1 | 5/2009 | Ashworth |
| 2009/0143918 A1 | 6/2009 | Amundson et al. |
| 2009/0204262 A1 | 8/2009 | Nishimura |
| 2009/0204410 A1 | 8/2009 | Mozer et al. |
| 2009/0323904 A1 | 12/2009 | Shapiro et al. |
| 2010/0223055 A1 | 9/2010 | McLean |
| 2010/0332235 A1 | 12/2010 | David |
| 2011/0046792 A1 | 2/2011 | Imes et al. |
| 2011/0140914 A1 | 6/2011 | Pelech et al. |
| 2011/0210816 A1 | 9/2011 | Wang |
| 2011/0257973 A1 | 10/2011 | Chutorash et al. |
| 2011/0260832 A1 | 10/2011 | Ross et al. |
| 2011/0290893 A1 | 12/2011 | Steinberg |
| 2012/0021684 A1 | 1/2012 | Schultz et al. |
| 2012/0062729 A1 | 3/2012 | Hart et al. |
| 2012/0065973 A1 | 3/2012 | Cho et al. |
| 2012/0066286 A1 | 3/2012 | Heredia et al. |
| 2012/0116748 A1 | 5/2012 | Kore et al. |
| 2012/0123561 A1 | 5/2012 | Park et al. |
| 2012/0136666 A1 | 5/2012 | Corpier et al. |
| 2012/0158161 A1 | 6/2012 | Dohn et al. |
| 2012/0327115 A1 | 12/2012 | Chhetri et al. |
| 2013/0006400 A1 | 1/2013 | Daceres et al. |
| 2013/0035774 A1 | 2/2013 | Warren et al. |
| 2013/0077797 A1 | 3/2013 | Hoy et al. |
| 2013/0117395 A1 | 5/2013 | Bushmitch et al. |
| 2013/0138250 A1 | 5/2013 | Mowery et al. |
| 2013/0183944 A1 | 7/2013 | Mozer et al. |
| 2013/0297078 A1 | 11/2013 | Kolavennu |
| 2014/0098233 A1 | 4/2014 | Martin et al. |
| 2014/0153281 A1 | 6/2014 | Zhao et al. |
| 2014/0153747 A1 | 6/2014 | Contolini et al. |
| 2014/0163751 A1 | 6/2014 | Davis et al. |
| 2014/0195233 A1 | 7/2014 | Bapat |
| 2014/0266687 A1 | 9/2014 | Britton |
| 2014/0278394 A1 | 9/2014 | Bastyr et al. |
| 2014/0330435 A1 | 11/2014 | Stoner et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0077553 A1 | 3/2015 | Dawes |
| 2015/0187354 A1 | 7/2015 | Kim |
| 2015/0276254 A1 | 10/2015 | Nemcek et al. |
| 2015/0279134 A1 | 10/2015 | Warren |
| 2015/0324179 A1 | 11/2015 | Nye |
| 2016/0134632 A1 | 5/2016 | Cregg |
| 2016/0134966 A1 | 5/2016 | Fitzgerald et al. |
| 2016/0249132 A1 | 8/2016 | Oliaei |
| 2016/0360526 A1 | 12/2016 | Lehmann et al. |
| 2017/0019362 A1 | 1/2017 | Kim et al. |
| 2018/0176680 A1 | 6/2018 | Knight et al. |
| 2018/0367944 A1 | 12/2018 | Heo et al. |

FOREIGN PATENT DOCUMENTS

| | | |
|---|---|---|
| CN | 2020092667 | 12/2011 |
| CN | 102332204 | 1/2012 |
| CN | 102436273 | 5/2012 |
| EP | 1054387 | 11/2000 |
| EP | 1119191 | 7/2001 |
| EP | 1260886 | 11/2002 |
| EP | 1345360 | 7/2006 |
| EP | 1135757 | 11/2006 |
| EP | 1415218 | 2/2011 |
| EP | 2801972 | 11/2014 |
| GB | 2094508 | 9/1982 |
| JP | 3803045 | 8/2006 |
| JP | 2006208460 | 8/2006 |
| JP | 2006317573 | 11/2006 |
| JP | 4503310 | 7/2010 |
| JP | 2010181064 | 8/2010 |
| JP | 4533844 | 9/2010 |
| JP | 2010236759 | 10/2010 |
| JP | 4640178 | 3/2011 |
| JP | 4839605 | 12/2011 |
| KR | 20100026353 | 3/2010 |
| KR | 20110012048 | 2/2011 |
| KR | 20110045314 | 5/2011 |
| KR | 20120017492 | 2/2012 |
| KR | 101151571 | 5/2012 |
| WO | WO1993/13507 | 7/1993 |
| WO | WO1999/34339 | 7/1999 |
| WO | 0021053 A1 | 4/2000 |
| WO | 2006033760 A2 | 3/2006 |
| WO | WO2006/126192 | 11/2006 |
| WO | WO2007/101164 | 9/2007 |
| WO | WO2008/018102 | 2/2008 |
| WO | WO2009/107211 | 9/2009 |
| WO | WO2009/147927 | 10/2009 |
| WO | 2014004911 A2 | 1/2014 |
| WO | 2015026933 A2 | 2/2015 |

OTHER PUBLICATIONS

Action Talking Prodcuts LLC, "Kelvin Installation Manual," V1.5, pp. 1-15, downloaded Jul. 14, 2015.

Brown, et al., "Joint DoD/Industry Study on Opprotunities in Integrated Diagnostics," Institute for Defence Analysis, 110 pages, Jan. 1990.

Carrier Comfort Network, "Carrier Comfort System VVT$_{III}$," 6 pages, Aug. 1996.

Carvalho et al., "Voice Thermostat Remote Control," Proceedings of the IEEE 25$^{th}$ Annual Northeast Bioengineering Conference, pp. 59-60, Apr. 8-9, 1999.

Coleman (a Johnson Controls Company), "Hints for Homeowner's, A Thermostat That Speaks to Cosumer's Needs," 1 page, on or before Jul. 20, 2006.

Communication regarding EP Application 14 758 758.8, 5 pgs., dated Jul. 5, 2019.

International Search Report for PCT application serial No. PCT/US2013/039326, dated Aug. 6, 2013.

Extended European Search Report for EP Application 14806841.1, dated Jan. 24, 2017.

Honeywell, "PM7006A Network Compatible Computer Room Air Conditioning (CRAC) Program Module for W7600 Control Module," 72 pages, Aug. 1993.

http://www.accendaoroducts.com/kelvin/index.html, "Kelvin Voice Operated Thermostat." 2 pages, printed Dec. 9, 2013.

https://atthub.com/diilitechiio/SiriProxy-NextLearningthennostal "Siri Proxy-NextLearning Thermostat," 3 pages, printed Jan. 6, 2014.

http://www.automotedliving.com, "Control Your Home by Voice or the Web, Anytime Anywhere", 1 page, printed Dec. 9, 2013.

http://www.broadenedliorizons.com/voiceir/, VoiceIR Enviromental Voice Controller Configuration ~ Broadened Horizons, 17 pages, Dec. 9, 2013.

(56) References Cited

OTHER PUBLICATIONS https://github.com/plamoni/SiriProxy, "SiriProxy," 7 pages, printed Dec. 9, 2013.
Icomfort Thermostat Manual, 2012 edition Retrieved from the internet Jun. 14, 2017 URL:http://airmastersheating.com/Lennox_icomfortWiFi_Manual.pdf.
http://www.innotechsystems.com/voice.htm, "Voice Recognition & Voice Interactive Products," 1 page, printed Dec. 9, 2013.
http://www.rciautomation.com/thermostat phone.htm. "Telephone Controlled Thermostat." 4 pages, printed Dec. 9, 2013.
https ://storify. com/plumbingtipd969/a-thermostat-that-speaks-to-a-consumer-s-needs. "A Thermostat That Speaks to a Consumer's Needs," 3 pages, printed Jul. 14, 2015.
http://www.talkingthermostats.com/blind.shtml, "Talking Thermostats for Persons who are blind," 3 pages, printed Dec. 12, 2013.
Jacobson, "Design: A Voice Activated Thermostat," Biomedical Sciences Instrumentation, Technical Papers Composing the Proceedings of the 29th Annual Rocky Mountain Bioengineering Symposium & 29th International ISA Biomedical Sciences Instrumentation Symposium, vol. 28, pp. 15-19, 1992.
Lacquet et al, "Short Communications, An Affordable Digital-Display-to-Natural-Voice Converter for Visually Impaired Radio Amateurs," IEEE Transactions on Rehabilitation Engineering, vol. 4, No. 4, 6 pages, Dec. 1996.
Lee et al., "Fault Detection in an Air-Handling Unit Using Residual and Recursive Parameter Identification Methods," ASHRAE Transactions vol. 102, Pt. 1, pp. 1-12, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23rd Northeast Bioengineering Conference, pp. 68-69, May 21-22, 1997.
Nusca, Andrew: "How Apple's Siri really works / ZDNET", pp. 14 XP055174567, Nov. 3, 2011.
Piette et al., "Model-Based Chiller Energy Tracking for Performance Assurance at a University Building," Cool Sense National Forum on Integrated Chiller Retrofits, San Francisco, Calif, LBNL Report—40781, 17 pages, Sep. 1997.
SmartWay Solutions, Inc., "Talking Thermostat Model VT3000, Riser's Guide," pp. 1-20, downloaded Jul. 14, 2015.
Systems Controls & Instruments, LLC, "CEM-24 Series Owner's Manual—Installation and Operating Instructions," 32 pages, downloaded Jul. 14, 2015.
https://www.talkingthermostats.com/blind.shtml, "Comfort Solutions for Persons Who are Blind or have Low Vision, VIP 3000 Residential Talking Thermostat that Promotes Independent Living," 2003.
Venstar, "Comfort Call System ACC0433 Owner's Manual," 24 pages, Aug. 2007.
Walters, "Siri Hack Allows Voice Control of Home Thermostat," found at http://www.extremetech.com/computing/106073-siri-hack-allows-voice-control-of-home . . . 2 pages, Nov. 21, 2011.
Watt, "Development of Empirical Temperature and Humidity-Based Degraded-Condition Indicators for Low-Tonnage Air-Conditioners," Thesis, ESL-TH-97/12-03, 205 pages, Dec. 1997.
Watt, "Predictive Maintenance Programs (PMP's) in Small HVAC Applications: Analysis of Available Products and Technology," ESL Report from Paper Prepared for MEEN 662, 4 pages, Apr. 1994.
Web.archive.org/web20030215020919/http:wAvw.jdstechnologies.com/'stargate.html, "Stargate Interactive Automation System: JDS Technologies," 9 pages, printed May 9, 2013.
International Search Report regarding PCT/US2014/051874, 6 pgs., dated Mar. 17, 2015.
2 Gig Technologies, "Go Control Wireless Security System, Installation & Programming Instructions," 52 pages, 2010.

DEVICES AND METHODS FOR INTERACTING WITH AN HVAC CONTROLLER

CROSS-REFERENCE TO RELATED APPLICATIONS

This application is a divisional of and claims the benefit of the filing date of U.S. application Ser. No. 16/043,016 filed Jul. 23, 2018, which is a continuation of and claims the benefit of the filing date of U.S. application Ser. No. 14/463,712 filed Aug. 20, 2014, which issued as U.S. Pat. No. 10,047,970 on Aug. 14, 2018, which claims priority to and claims the benefit of the filing date of U.S. Application No. 61/868,441 filed Aug. 21, 2013.

TECHNICAL FIELD

The present disclosure relates generally to HVAC systems or building automation systems, and more particularly to HVAC controllers that accommodate and/or facilitate control of an HVAC system.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Such HVAC controllers typically have a user interface for allowing a user to interact with the HVAC controller. The user interface is often integral with the HVAC controller housing, but in some instances, can be remote from the HVAC controller but in direct or indirect communication therewith, such as when using a user interface of a smart phone, tablet computer, personal computer, laptop etc.

SUMMARY

The present disclosure pertains generally to HVAC systems or building automation systems, and more particularly to controllers such as thermostats that accommodate and/or facilitate control of an HVAC system via voice control. In one illustrative embodiment, a thermostat may be controlled in accordance with a voice control system. The thermostat may include a housing configured to at least partially house a control module, a microphone, a speaker, a display, and a voice recognition module. The control module of the thermostat may be configured to provide one or more control signals to control one or more HVAC components of an HVAC system in accordance with a thermostat control algorithm. The voice recognition module may be configured to recognize a predetermined audible trigger via the microphone, and in response, provide one or more audio clips via the speaker and/or video clips via the display for assisting a user in operating the thermostat.

In some illustrative instances, a thermostat configured to communicate with and control one or more HVAC components may include a housing configured to at least partially house a control module, a display, and a help module. Illustratively, the control module may be configured to provide one or more control signals to control one or more components of an HVAC system in accordance with a thermostat control algorithm and the help module may be configured to play one or more prerecorded video clips on the display to assist a user in operating the thermostat.

In some illustrative instances, a thermostat configured to communicate with and control one or more HVAC components of an HVAC system may include a control module, a temperature sensor, and a voice recognition module. Illustratively, the control module may be configured to provide one or more control signals to control one or more HVAC components of an HVAC system in accordance with a thermostat control algorithm and the voice recognition module may be configured to play one or more prerecorded clips in response to detecting a user needs assistance with operating the thermostat.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
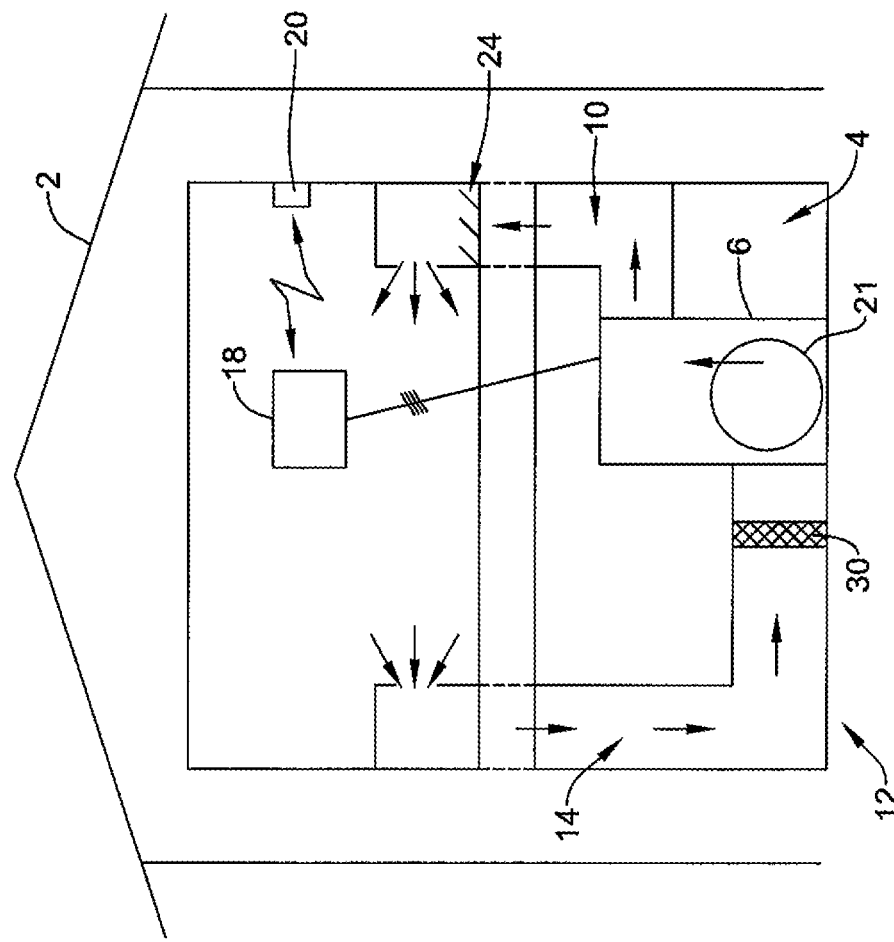
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative building automation system 4. While FIG. 1 shows a typical forced air type HVAC system as an illustrative building automation sub-system 12 of a building automation system 4, other building automation sub-systems 12 of a building automation system 4 are contemplated including, but not limited to, security systems, lighting control systems, water heater systems (e.g., boiler systems), refrigerators, clothes washers, clothes dryer, ovens, garage doors, radiant heating systems, electric heating systems, cooling systems, heat pump systems, any other suitable sub-system 12 of building automation systems 4, and/or portions thereof, as desired. In some cases, building automation systems 4 may include an internet gateway 20 (e.g., a modem or other device facilitating a communication link) or other device that may allow one or more of the HVAC components 6, as described herein, to communicate over a wide area network (WAN) such as, for example, the Internet, and/or a device 20 that may allow one or more HVAC components 6 to communicate over any other network.

The illustrative HVAC system of FIG. 1 includes one or more HVAC components 6, a system of ductwork and air vents including a supply air duct 10 and a return air duct 14, and one or more building automation controllers 18 (e.g., HVAC controllers). The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that a building automation controller(s) 18 may be configured to activate, deactivate and/or otherwise modulate the building automation sub-system(s) 12 thereof (e.g., HVAC components 6) in a controlled manner (e.g., to control the comfort level in the structure or building 2 and/or otherwise operate electronic features of the building 2). The building automation controller(s) 18 may be configured to control the building automation controller devices or building automation sub-systems 12 via a wired and/or wireless communication link 20.

In some cases, the building automation controller(s) 18 may be a thermostat, such as, for example, a wall mountable thermostat or intelligent power switch (e.g., power switch for controlling appliances not equipped with communications capabilities and other appliances), but this is not required in all instances. An example thermostat may include (e.g. within the thermostat housing), or have access to, a temperature sensor for sensing an ambient temperature at or near the thermostat. In some instances, the building automation controller(s) 18 may be a zone controller (e.g., which may or may not be embodied in a thermostat), or may include multiple zone controllers each monitoring and/or controlling the comfort level within a particular zone in the building or other structure.

In the illustrative building automation system 4 shown in FIG. 1, the HVAC component(s) 6 may provide heated air and/or cooled air via the ductwork 10, 14 throughout the building 2. As illustrated, the HVAC component(s) 6 may be in fluid communication with every room and/or zone in the building 2 via the ductwork 10 and 14, but this is not required. In operation, when a heat call or command signal is provided by the building automation controller(s) 18, an HVAC component 6 (e.g., a forced warm air furnace) may be activated to supply heated air to one or more rooms and/or zones within the building 2 via supply air ducts 10. The heated air may be forced through the supply air duct 10 by a blower or fan 21. In this example, the cooler air from each zone may be returned to the HVAC component 6 for heating via return air ducts 14. Similarly, when a cool call or command signal is provided by the building automation controller(s) 18, an HVAC component 6 (e.g. air conditioning unit) may be activated to supply cooled air to one or more rooms and/or zones within the building or other structure via supply air ducts 10. The cooled air may be forced through the supply air duct 10 by the blower or fan 21. In this example, the warmer air from each zone may be returned to the HVAC component 6 (e.g. air conditioning unit) for cooling via return air ducts 14.

In some cases, the system of vents or ductwork 10 and/or 14 may include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an opened position, a closed position, and/or a partially opened position to modulate the flow of air from one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and/or other pollutants from the air inside the building 2. In the illustrative example shown in FIG. 1, the air filter(s) 30 are installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component 6.

Figure 3:
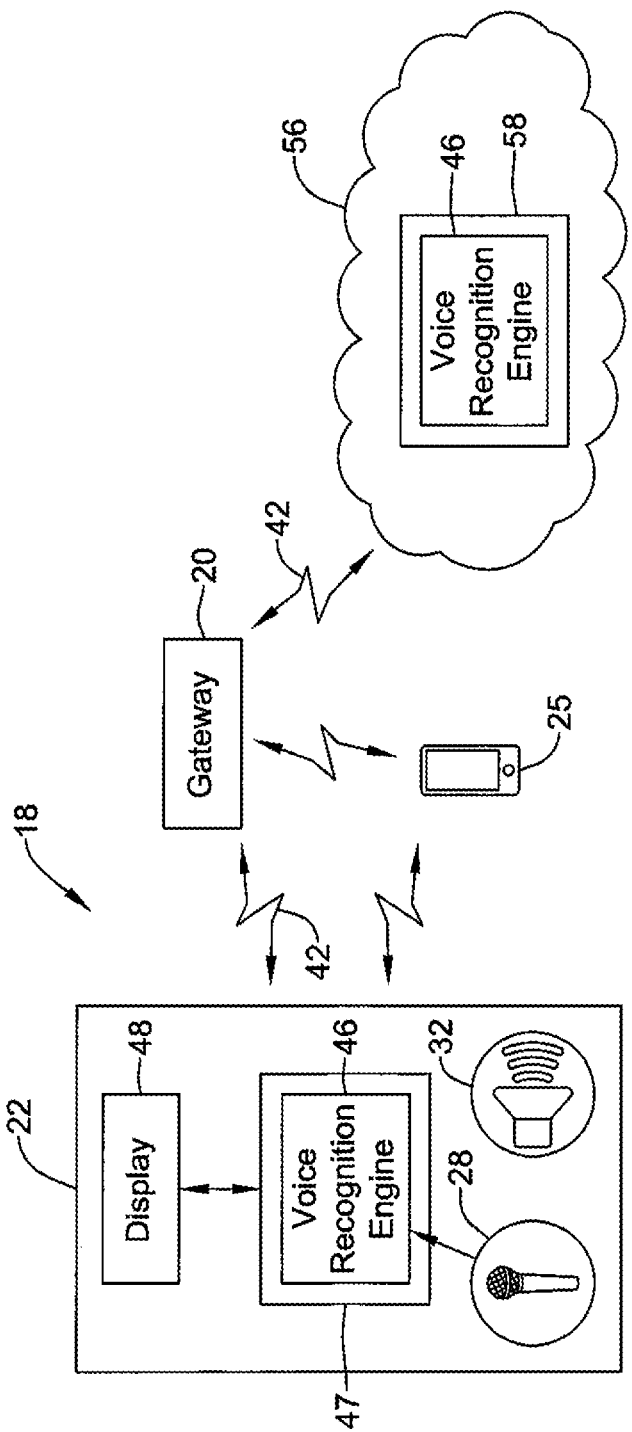
FIG. 3 is a schematic view of an illustrative thermostat interface network structure.

Depending upon the application and/or where the building automation system user is located, remote access and/or control of the building automation controller 18 may be provided, at least partially, over a first network (e.g. a local WiFi network) and/or a second network (e.g. a wide area network such as the Internet), as shown in FIG. 3. In some instances, the first network and/or the second network may collectively be considered a network. A non-limiting example of a network connected building automation system is described in U.S. patent application Ser. No. 13/559,470, entitled METHOD OF ASSOCIATING AN HVAC CONTROLLER WITH AN EXTERNAL WEB SERVICE, filed Jul. 26, 2012, and hereby incorporated by reference in its entirety. Another non-limiting example of a network connected building automation system is described in U.S. patent application Ser. No. 13/875,213, entitled DEVICES AND METHODS FOR INTERFACING WITH AN HVAC CONTROLLER, filed May 1, 2013, and hereby incorporated by reference in its entirety. Yet another non-limiting example of a network connected building automation system is described in U.S. application Ser. No. 13/911,638 entitled INTERACTING WITH A CONTROL SYSTEM THAT IS CONNECTED TO A NETWORK, filed on Jun. 6, 2013, which is hereby incorporated by reference in its entirety.

In some instances, a user may use the building automation controller 18 (e.g., a thermostat 22) to adjust a parameter of the building automation system 4 or to initiate an action of the building automation system 4 in a hands-free and/or eyes-free manner. A user might not be able to, or may not wish to, interact with a typical touch user interface of the thermostat 22 or of a device in communication with the thermostat 22 (e.g. smart phone) for one or more reasons. For example, in some cases, a user may not physically interact with the user interface of the thermostat 22 because of what they are doing (e.g., hands are full of items as they are leaving home), where they are located (e.g., they are in a different room than the room where the thermostat 22 is located), inconvenience, disability, and/or because of any other reason.

Figure 2:
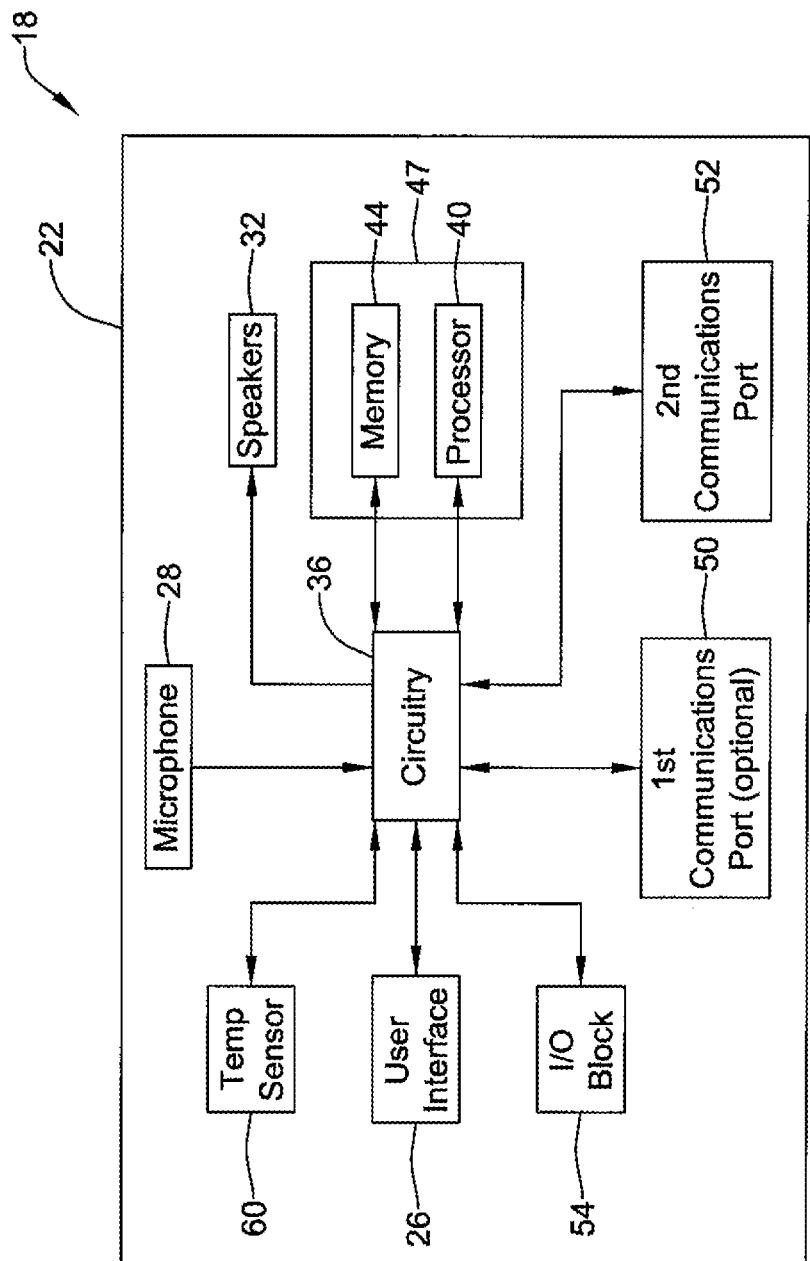
FIG. 2 is a schematic block diagram of an illustrative HVAC controller.

In some cases, the thermostat 22 or other building automation controllers 18 may include a hands-free and/or eyes-free user interface 26 that utilizes voice control, sometimes with audible confirmations (e.g., two-way audible communication). As illustrated in FIG. 2, the thermostat 22 may include one or more embedded or connected microphone(s) 28 and/or one or more embedded speakers or connected speakers 32, along with support circuitry 36 to allow the thermostat 22 to receive, record, and/or playback sound. Further, the thermostat 22 may include a controller 47 that includes a processor 40 and a memory 44 to further facilitate receiving, recording, and/or playing back sound, along with facilitating other functionality of the thermostat 22.

The microphone(s) 28 and the speaker(s) 32, as shown for example in FIG. 2, may be provided integrally with the thermostat 22 or otherwise connect to the thermostat 22 and may be in communication with the circuitry 36 of the thermostat 22 to communicate with other features of the thermostat 22 (e.g., the memory 44, the processor 40, the first communications port 50, the second communications port 52, and/or the user interface). In some instances, the speaker(s) 32 and/or the microphone(s) 28 may be integral with user interface 26 of the thermostat 22 and in some instances, the microphone(s) 28 and speaker(s) 32 may be separate from the user interface 26 of the thermostat 22.

Illustratively, a plurality of microphones 28 may be provided integrally with, or in communication with, the thermostat 22, where the plurality of microphones 28 may be provided to increase the functionality and/or improve the performance of the thermostat 22. For example, a plurality of microphones positioned in or otherwise in communication with the thermostat 22 may allow for noise cancellation functionality at the thermostat 22 or in the cloud 56, echo cancellation functionality at the thermostat 22 or in the cloud 56, beam forming or spatial filtering functionality (e.g., the ability to determine from which direction a voice is coming and remove unwanted noise) at the thermostat 22 or in the cloud 56, increase the area from which sound may be reliably obtained (e.g., especially when the microphones face different directions), and/or increase the functionality and/or improve the performance of the thermostat 22 in any other suitable way.

In some cases, the thermostat 22 may include a timer, sometimes implemented by circuitry 36 and/or processor 40. The thermostat 22 may also include an input/output block (I/O block) 54 for receiving one or more signals from components of the building automation system 4 and/or for providing one or more control signals to components of the building automation system 4. Alternatively, or in addition, the I/O block 54 may communicate with another controller, which may be in communication with one or more HVAC components of the building automation system 4, such as a zone control panel in a zoned HVAC system, Equipment Interface Module typically located remote from the thermostat 22 and/or by or near one or more building system components, or any other building control device.

The illustrative thermostat 22 may include an internal temperature sensor 60, but this is not required. In some cases, the thermostat 22 may communicate with one or more remote temperature sensors, humidity sensors, microphone/audio sensors, speakers, displays, and/or occupancy sensors located throughout the building or structure. Also, the thermostat 22 may communicate with a temperature sensor, humidity sensor, and/or other sensor located outside of the building or structure for sensing an outdoor temperature and/or humidity if desired.

The processor 40 of controller 47 may operate in accordance with an algorithm that controls or at least partially controls the operation of thermostat 22. The processor 40 may, for example, operate in accordance with a control algorithm that controls one or more building components, and may set or control temperature set points, humidity set points, schedules, start and end times, window frost protection, operating modes, and/or the like. At least a portion of the control algorithm may be stored locally in the memory 44 of the thermostat 22 and, in some cases, may be updated and/or programmed from an external web service over one or more of the first network and the second network. The control algorithm (or portion thereof) stored locally in the memory 44 of the building automation controller 18 may be updated in accordance with a predetermined schedule (e.g. once every 24 hours, 48 hours, 72 hours, weekly, monthly, etc.), updated in response to published changes to the control algorithm, updated in response to a user's request, and/or updated at any other time, as desired. The updates to the control algorithm or a portion of the control algorithm stored in the memory 44 may be received from an external web service over one or more of the first network and the second network. In some cases, the portion of the control algorithm that is updated may include settings such as set points, schedule times, and/or other settings, but this is not required.

In some instances, the processor 40 may operate according to a first operating mode having a first temperature set point, a second operating mode having a second temperature set point, a third operating mode having a third temperature set point, and/or the like, where the temperature set points may be different values or the same value. In some cases, the first operating mode may correspond to an occupied mode and the second operating mode may correspond to an unoccupied mode. In some cases, the third operating mode may correspond to a holiday or vacation mode wherein the building or structure in which the building automation system 4 is located is expected to be unoccupied for an extended period of time. In other cases, the third operating mode may correspond to a sleep mode wherein the building occupants are expected to be either asleep or inactive for a period of time. These are just some examples. It will be understood that the processor 40 may be capable of operating in additional or fewer modes, as necessary or desired.

The number of operating modes and/or the operating parameter settings associated with each of the operating modes may be established locally through a user interface, and/or through an external web service and delivered to the thermostat 22 via one or more of the first network and the second network where they may be stored in the memory 44 for reference by the processor 40.

In some cases, the processor 40 may operate according to one or more predetermined operating parameter settings associated with a user profile associated with a particular individual user. The user profile may be stored in the memory 44 of the building automation controller 18 and/or may be hosted by an external web service and stored on an external web server 58. The user profile may include one or more user-selected settings for one or more operating modes that may be designated by the user. For example, the processor 40 may operate according to a first operating mode having a first temperature set point associated with a first user profile, a second operating mode having a second temperature set point associated with the first user profile, a third operating mode having a third temperature set point associated with the first user profile, and/or the like, where the temperature set points may be the same value or different values. In some cases, multiple user profiles may be associated with the thermostat 22. In certain cases, where two or more user profiles are associated with the thermostat 22, the processor 40 may be programmed to include a set of rules for determining which individual user profile takes precedence for controlling the HVAC system when both user profiles are active.

The memory 44 of the thermostat 22 may be in communication with the processor 40, as shown for example in FIG. 2 (e.g., through the circuitry 36). The memory 44 may be used to store any desired information, such as the aforementioned control algorithm parameters, recorded voice messages, etc. The memory 44 may be any suitable type of storage device including, but not limited to, RAM, ROM, EPROM, flash memory, a hard drive, and/or the like. In some cases, the processor 40 may store information within the memory 44, and may subsequently retrieve the stored information from the memory 44. In some cases, the memory 44 may be part of the processor 40.

In the illustrative example shown in FIG. 2, the user interface 26, when provided, may be any suitable user interface that permits the thermostat 22 to provide and/or solicit information, as well as to accept one or more user interactions. For example, the user interface 26 may permit a user to locally enter data such as temperature set points, humidity set points, starting times, ending times, schedule times, diagnostic limits, responses to alerts, and/or the like. In some instances, the user interface 26 may be a physical user interface that is accessible at the thermostat 22, and may include a display 48, a microphone 28, a speaker 32, and/or a distinct keypad. The display may be any suitable display. In some instances, a display may include or may be a liquid crystal display (LCD), and in some cases a fixed segment display or a dot matrix LCD display. In other cases, the user interface 26 may be a touch screen LCD panel that functions as both a display and keypad. The touch screen LCD panel may be adapted to solicit values for a number of operating parameters and/or to receive such values, but this is not required. In similar or other cases, the user interface 26 may be a dynamic graphical user interface. Alternatively, the user interface may be a voice only interface without a display and/or without non-voice input capabilities.

In some instances, the user interface 26 need not only be accessible to a user at the thermostat 22. Additionally, or alternatively, the user interface 26 may be a virtual user interface 26 that is accessible via the first network and/or second network using a mobile wireless device or other device such as one of the remote devices described herein.

In some cases, the user interface 26 may include a hands-free, eyes-free user interface accessible through the microphone 28 and sometimes speaker 32 with optional feedback on the display 48. For example, the processor 40 may be configured to receive and accept user input entered via an audio stream received via the microphone 28 (e.g., through interaction with one or more voice recognition engines), and may include user input related to temperature set points, humidity set points, starting times, ending times, schedule times, window frost protection settings, diagnostic limits, responses to alerts and/or any other suitable user input.

The present disclosure provides a mechanism where voice messages (e.g., contained in audio streams) recorded on a non-transitory computer readable medium (e.g., the memory 44) and/or streamed may be used as the messaging system between a user and an Internet connected thermostat 22. These voice messages, which may include voice commands, may be received, for example, from a user at the thermostat 22 and/or from a user via a remote device in the vicinity of the user issuing the voice commands. In one example, the thermostat 22 may be accessed and/or controlled through voice control (e.g., in a hands-free and/or eye-free manner) at the thermostat 22 with the microphone(s) 28 and the speaker(s) 32, and/or accessed and/or controlled from a remote location (e.g., remote from the thermostat 22) over the first network and/or second network with any suitable remote device 25 that has a microphone including, but not limited to, mobile phones including smart phones, PDAs, tablet computers, laptop or personal computers, wireless network-enabled key fobs, e-Readers and the like.

When a remote device 25 is used for accessing and/or controlling the thermostat 22 through voice control, it is contemplated that an application program may be downloaded and run on the remote device 25. The application program may facilitate the recording and/or processing of voice commands from a user.

As shown in FIG. 2, the illustrative thermostat 22 (e.g., building automation controller 18) may include a first communication port 50 for communicating over a first network (e.g. a first wireless network, a first wired network, a wireless LAN, a wired LAN, WAN, the internet, etc.), a second communication port 52 for communicating over a second network (e.g. a second wireless network, a second wired network, a wireless LAN, a wired LAN, a WAN or the Internet), and/or one or more other communication ports. In one example, the first communication port 50 may be a wired or wireless communications port, and may include a transceiver for sending and/or receiving signals in a wired or wireless manner over a first network (e.g., wired and/or wireless network). The second communication port 52 may be a wired or wireless communication port including a transceiver for sending and/or receiving signals in a wired or wireless manner over a second network (e.g., a second wired or wireless network). In some cases, the second communication port 52 may be in communication with a wired or wireless router or gateway for connecting to the second network, but this is not required. In some cases, the router or gateway may be integral to the thermostat 22 or may be provided as a separate device.

In many cases, the thermostat 22 may be configured to communicate wirelessly over the first network and/or second network (e.g., to communicate with a remote device 25 and/or the cloud 56) via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired. In some instances, the thermostat 22 may utilize an open or proprietary protocol to communicate with other devices (e.g., a web server 58 with data cache) and/or remote devices (e.g., mobile devices, voice reception boxes, etc.).

In order to expand the communication capabilities to include, voice, touch, mouse, keyboard, or other interfaces from remote locations, infrastructure in addition to typical remote devices 25, the open or proprietary protocol, and/or the thermostat 22 may optionally be included in the networked infrastructure. Such additional infrastructure may include, for example, infrastructure of a cloud 56 (e.g., the Internet) and/or a web server 58 in the cloud, as shown in FIG. 3.

The cloud or cloud infrastructure 56 (also known as, cloud computing) may include computing resources (e.g., hardware and/or software) capable of delivering a service over a network and capable of maintaining or storing a data cache. The data cache stored in the cloud infrastructure 56 may store information about the thermostat 22. For example, the data cache may store a current status and/or settings of the thermostat 22, the model number, type and/or other information about thermostat 22 and/or the user.

In some cases, the thermostat 22 may be programmed to communicate over the first network and/or the second network with an external web or cloud service hosted by one or more external web servers 58 in the cloud 56. A non-limiting example of such an external web service is Honeywell's TOTAL CONNECT™ web service. Illustratively, the thermostat 22 may be configured to upload selected data via the second network to the external web service where it may be collected and stored on the external web server 58. In some cases, the data may be indicative of the performance of the building automation system 4, building control settings, and/or recorded voice commands to be interpreted by a voice recognition engine 46 of the external web service into commands understandable to the thermostat 22. Additionally, the thermostat 22 may be configured to receive and/or download selected data, settings, and/or services including software updates from the external web service over the first network and/or the second network, and/or commands that are understandable to the thermostat 22. The data, settings, and/or services may be received automatically from the web service, downloaded periodically in accordance with a programmed algorithm, downloaded in response to a user request, and/or received in any other suitable way.

In the non-limiting example shown in FIG. 2, the thermostat 22 may be configured to receive and/or download from the cloud 56 or other source an HVAC operating schedule and/or operating parameter settings such as, for example, temperature set points, humidity set points, start times, end times, window frost protection settings, and/or the like. In some instances, the thermostat 22 may be configured to receive one or more user profiles having at least one operational parameter setting that is selected by and reflective of a user's preferences. In some instances, the thermostat 22 may be configured to receive local weather data, radar data, weather alerts and/or warnings, major stock index ticker data, and/or news headlines over the second network. These are just some examples.

In some instances, the external web server 58 may receive and accept the user input entered via the microphone 28, and associate the user input with a user's account on the external web service and/or on the thermostat 22. In some cases, if the user input includes changes to parameters associated with the existing control algorithm, including changes to any temperature set points, humidity set points, schedule, start and end times, window frost protection settings, operating modes, user profile changes, or any other suitable parameter, the external web server 58 may identify the corresponding parameter, as applicable, and transmit the updated parameter value to the thermostat 22 over the first network and/or second network, where it is received via the first communication port 50 and/or second communication port 52 of the thermostat 22 and stored in the memory 44 for execution by the processor 40.

When voice messages or recordings are used to command the thermostat 22, it is contemplated that any suitable voice recognition software (e.g., VLINGO™, DRAGON™, etc.) may be used. Illustratively, the processor 40 of thermostat 22 may be configured to implement a limited voice recognition engine that is not intended to recognize all or most of the words in a dictionary, but may be configured to identify limited words and phrases such as a trigger phrase included in a voice message and in some cases a limited command set. Such a configured processor 40 may allow the thermostat 22 to be controlled via voice control with fairly limited resources.

At least a portion of a voice recognition engine 46 may be included within the thermostat 22. In FIG. 3, the voice recognition engine 46 is shown internal to a casing of the thermostat 22 with a display 48, microphone(s) 28, speaker (s) 32, and a control module 47 that may provide one or more control signals to control one or more HVAC components 6 of the building automation sub-system 12 (e.g., an HVAC system). The control module 47 may include the memory 44 and processor 40 of FIG. 2, and the memory 44 may include instructions executable by the processor 40 to operate/communicate with the voice recognition engine 46. In addition, or alternatively, the thermostat 22 may interact with a voice recognition engine 46 (e.g., a voice recognition engine 46 on a web server or other server) via a communication link 42 (e.g., a wired or wireless communication link) and/or an internet gateway 20, as also shown in FIG. 3. In some cases, the voice recognition engine 46 on the thermostat 22 and the voice recognition engine 46 provided by a web server 58, when both are provided, may cooperate to act like a single voice recognition engine 46 through communication over one of the communication ports 50, 52, or may act like separate voice recognition engines 46 in communication with one another over one or more of the communication ports 50, 52.

In some instances, the voice recognition engine 46 (e.g., including voice recognition software such as voice-to-text software and/or text-to-voice software) and translation software may be at least partially stored in the memory 44 of the thermostat 22, such that the thermostat 22 may directly receive, identify, and translate a voice message (e.g., an audio or voice stream) into a thermostat 22 understandable command. Command phrase voice messages in a voice stream received by the thermostat 22 may be in a natural language format (e.g., a format not typically understood by a thermostat 22 as a command), such as a trigger phrase of "Hello Thermostat", a command of "Increase Temperature by 3 Degrees", or user intention commands in a natural language format such as "I am feeling cold".

In one example of a thermostat responding to a natural language voice message, a user may issue one or more natural language voice messages to the thermostat 22 via the microphone 28 when the user is in the vicinity of the thermostat 22. The thermostat 22 may receive the natural language voice message, translate the voice message to a command understandable by the thermostat 22, perform an action in response to the command, and/or respond to the received voice message with one or more of a natural language text based message, an audible natural language message as interpreted with text-to-voice voice recognition software, and/or a predetermined video message. Further, if the thermostat 22 communicates with or has one or more remote sensors, the voice recognition and translation software may additionally, or alternatively, be stored and operated in those sensors. For example, some thermostats 22 may have remote temperature sensors and/or remote control devices that may be placed in different rooms in the house, and the voice recognition engine(s) 46 may be at least partially embedded in one or all of these sensors and/or remote control devices.

Although a thermostat 22 may need to know it is to set a parameter at an exact value, such as the parameter value itself and parameter units (e.g., where the parameter is temperature, the parameter units may be degree F. (Fahrenheit) or degree C. (Celsius)), the thermostat 22 may always be selectively set to operate in a particular parameter unit. As a result, it can be expected that when a user 62 says a command related to a parameter (e.g., temperature), the user 62 is indicating that the parameter to be set is a parameter value consistent with the units by which the thermostat 22 is currently operating. The parameter units for one or more particular parameters (e.g., temperature, humidity, etc.) may be preprogrammed into the thermostat 22 at a manufacturer or selectively set by a user. Additionally, or alternatively, the thermostat 22 and/or the voice recognition engine 46 may apply different parameter units to different voice commands or when different users provide voice commands, where the thermostat 22 and/or voice recognition engine 46 may infer from the context of a voice command the appropriate parameter unit to apply to the voice command with or without a parameter unit actually recited in the voice stream that includes the voice command.

In operation, the thermostat 22 may exchange its parameter units with the voice recognition engine 46 via internal messaging, such that the voice recognition engine 46 will then be synchronized with the thermostat 22 as far as parameter units are concerned. Then, once a user 62 speaks a natural language voice command, the voice recognition engine 46 will be able to compose audio feedback with the right parameter units, translate the identified voice command without units to a thermostat command that includes a parameter value and parameter units, and/or update the thermostat's set point temperature without requiring the user to say the units in a command. This has the ability to decrease the data flow and improves internet connection requirements, while reducing the number words the user 62 is required to say to modify a temperature set point.

When the voice recognition engine 46 of a controller 47 of the thermostat 22 identifies a trigger phrase in a received natural language voice stream, the voice recognition engine 46 may initiate processing of the natural language voice stream. During processing of the natural language voice stream, the voice recognition engine 46 may identify one of a plurality of different commands following the identified trigger phrase. In response to identifying one of a plurality of predetermined commands following the trigger phrase, the voice recognition engine 46 may generate a thermostat command that is understandable by the controller and instructs the controller 47 to perform and/or execute the particular identified command.

Illustratively, one or more of the identification of a trigger phrase, the identification of one or more of a plurality of predetermined commands, and the generation of a thermostat understandable command may be performed by the thermostat 22 (e.g., via the voice recognition engine 46 and/or other components of the thermostat 22). Alternatively, or in addition, one or more of the identification of a trigger phrase, identification of one or more of a plurality of predetermined commands, and the generation of a thermostat understandable command may be performed by the remote server 58 (e.g., via the voice recognition engine 46 and/or other feature of the remote server 58).

To facilitate processing and/or interpreting a natural language voice stream, the voice recognition engine(s) 46 may include a natural language interpreter (e.g., the translation software or speech recognition module) that translates the received natural language voice stream into text via a voice to a text voice recognition engine. The natural language interpreter may then compare the text to a predefined trigger phrase, and if a match is found, the natural language interpreter may look for a subsequent command in the text. The natural language interpreter may compare the text following an identified trigger phrase to a plurality of predefined commands. If a match is found and a command is identified, and depending on the identified command, the natural language interpreter may look for one or more parameters following the identified command. For example, if a natural language voice stream includes "Thermostat, please change the temperature to 74 degrees". The word "Thermostat" may be the trigger phrase, the word "change" may be the command, and 74 may be the "parameter" for the "change" command. The natural language interpreter may scan the text and identify "Thermostat" as the trigger phrase. The natural language interpreter may then scan the text following the word "Thermostat" for a valid predetermined command. When the natural language interpreter finds the command "change", the natural language interpreter may then begin looking for a numerical parameter for the "change" command. In this case, the natural language interpreter finds "74". The voice recognition engine 46 may then translate this into a command that is recognizable and executable by the controller 47 of the thermostat 22, such as "SP=74 F". The controller 47 of the thermostat 22 may then execute the command and change the set point to 74 degrees F.

In some instances, the controller 47 of the thermostat 22 may initiate processing of the natural language voice stream by sending at least part of the natural language voice stream (e.g., the natural language stream following a detected trigger phrase) to the remote server 58 via an output port of one of the communication ports 50, 52. In response to sending at least part of the natural language voice stream to the remote server 58, the thermostat 22 may receive via an input port of one of the communication ports 50, 52 a thermostat command corresponding to the portion of the natural language voice stream sent to the remote server 58.

In an illustrative example of utilizing a remote server 58 that includes at least a portion of the voice recognition engine 46 (e.g., a speech recognition module), the remote server may be configured to process the received portion of the natural language voice stream and then identify in the natural language voice stream one of a plurality of different predetermined commands for the thermostat 22. Once a command is identified by the remote server 58, the remote server 58 may generate a thermostat command and send the thermostat command back to the input port of one of the communication ports 50, 52 of the thermostat 22 for execution by the controller 47 of the thermostat 22.

In addition to or as an alternative to receiving a thermostat command from the remote server 58, the thermostat 22 may receive a natural language voice message (e.g., an audio clip), a video clip, or other audio/visual clip from the remotely located portion of the voice recognition engine 46 via the input port of one of the communication ports 50, 52. The thermostat 22 may play a received natural language voice message through the speakers 32 of the thermostat 22 and/or play the visual or video on the display 48 of the thermostat 22.

Illustratively, the thermostat understandable commands may change the state of the thermostat 22 (e.g., change the set point, enter a temporary or permanent hold mode, switch the system mode to off, heat or cool mode, turn on the fan, etc.), read the current state of the thermostat 22 (e.g., requesting a current temperature, a current humidity level, the remaining filter life, etc.), program a programmable setting (e.g. a programmable schedule setting), display certain information on the display of the thermostat, such as weather information, stock information and or any other information, and/or may perform any other suitable function, as desired. In some instances, the translation software may be executed on the thermostat 22, while in some other instances, the translation software may be executed on devices separate or independent from the thermostat 22, such as at a remote server 58, a remote device 25, and/or on any other suitable device. In some cases, part of the translation software may be executed by the thermostat 22 or remote device 25 (e.g. translation of the voice message to text) while another part of the translation software may be executed on a remote server 58 (e.g. interpret the intent behind the message, and translate the message into a command specific to the thermostat 22 that can be understood and executed by the thermostat 22), but these are just examples.

In some cases, when the thermostat 22 receives a thermostat understandable command, the thermostat 22 may not automatically accept the command, but may rather check the command against its settings (e.g., thermostat code). For example, the thermostat 22 may receive a thermostat understandable command related to a temperature set point (e.g., a command to change a set point temperature to a requested set point value, or any other command related to a temperature set point), the thermostat 22 may check the requested set point temperature against pre-set limits and accept the change only when the thermostat understandable command requests a change within the pre-set limits. If the command requests a change within the pre-set limits of the thermostat 22, a generated thermostat understandable command may instruct the controller 47 to change the set point temperature to the set point value and the thermostat 22 may in some cases audibly report over the speakers 32 the new set point value (e.g., the new temperature set point) resulting from an action taken by the thermostat 22 in response to the acceptable command. If the requested set point value is outside of a pre-set limit, a generated thermostat understandable command may instruct the controller 47 to change the set point temperature to a set point value that is within the limits, and in some cases the thermostat 22 may provide an audible response (e.g., verbal response or some other audible response) over the speakers 32 indicating the command was not executed, why the command was not executed (e.g., it was requested to set a temperature set point at a value outside of pre-set temperature set point limits), and/or the new, if new, set point value. Such an audible response may aid a user 62 in not having to walk to the thermostat 22 to check for possible issues with the thermostat 22. In some instances, the audible responses may facilitate an interview-like exchange with the user 62 by working with the user 62 to change pre-set limits of the thermostat 22 and/or to find an acceptable temperature set point or other action within the pre-set limits of the thermostat 22.

In some cases, a command may be associated with a macro that changes a number of parameters and/or settings in response to the command. For example, a voice command of "Good Night Thermostat" may be translated into a series of two or more commands that are each recognizable by the thermostat 22, such as a command that reduces the temperature set point to a sleep set point temperature, followed by a command that puts the fan into the circulate fan mode, followed by a command that turns the outside lights of the house off, followed by a command that turns the security system on.

In some cases, the number and type of commands that can be recognized and translated into commands may be intentionally limited. In addition, or alternatively, the format of the commands that can be recognized and translated into commands may be intentionally limited. This may make it easier for the translation software to recognize and translate the received voice commands into appropriate actions to be taken by the thermostat 22. This may help increase the accuracy and/or reliability of the voice command system and improve the response time, especially when the hardware resources are limited such as in some thermostats 22.

When formulating a command that is to be understandable by the thermostat 22, the voice recognition software and/or translation software of voice recognition engine 46 may take into account one or more parameters (e.g., a current set point temperature) stored in the data cache in the cloud infrastructure 56. For example, where a natural language message received from a user indicates "I am cold", the voice recognition engine 46 may check the data cache for the current set point temperature of the thermostat 22 (e.g., seventy-two degrees) and provide a command to the thermostat 22 that sets the set point temperature at seventy-four degrees (e.g. two degrees warmer than the current setpoint temperature). Once the natural language message from the user has been translated into a command understandable by the thermostat 22, the command may be sent to the thermostat 22 over a network having an open or proprietary protocol (e.g., an HVAC web services interface protocol, such as a web services application programming interface (API)), for example. As the translation may require space in the memory 44 for its storage and processing power by the processor 40 for its operation, maintaining the translation software of the voice recognition engine 46 in the cloud 56 or otherwise remote from the thermostat 22 (e.g., in a an area of a home or building separate from the particular location of the thermostat 22) may in some cases be useful in reducing the memory and/or processing resources needed at the thermostat 22 itself. In some cases, the thermostat 22 may have sufficient memory and/or processing resources and all the processing can take place at the thermostat 22 if desired.

Although the voice recognition engine 46 has been primarily described with respect to a voice recognition engine 46 on the thermostat 22, the voice recognition engine 46 or a portion of the voice recognition engine 46 may reside on a server 58 in the cloud 56 or on a server otherwise remote from the thermostat 22 (e.g., a server in the same building 2 as the thermostat 22 or in a different building than the thermostat 22), as referred to above. The functionality of the voice recognition engine 46 may be the same or may differ depending on the location of the voice recognition engine 46 with respect to thermostat 22. Factors that may determine functionality of the thermostat include, but are not limited to, the ability of a processor operating the voice recognition engine 46, the size of the memory associated with the voice recognition engine 46, etc.

The voice control system of the thermostat 22 may be initiated by the voice recognition engine 46 at the thermostat 22 after it recognizes an input, such as selection of a button or selectable option on a user interface 26, a trigger phrase, a command, or any combination of a user interface 26 selection, a trigger phrase, and a command presented together or separately. As used herein, a "trigger phrase" is a unique word, a unique set of words, and/or a unique sound, that lets the thermostat 22 know via the voice recognition engine 46 that the user would like to give a command to the thermostat 22. Trigger phrases may include, for example, "Hello, thermostat", "Hi, thermostat", etc. In some cases, the trigger phrase may be programmable by the user. As used herein, a "command" may, in one way or another, indicate what action(s) the user wants the thermostat 22 to perform.

In some instances, the voice recognition engine 46 of the thermostat 22 may be able to recognize trigger phrases such as "Thermostat", "Hello, thermostat" or "Hi, thermostat" in a voice stream, and take a specific action in response to recognizing the trigger phrase. In one example, if a user says "Thermostat Awake", the trigger phrase "Thermostat" may be recognized as well as the subsequent command "Awake". The command "Awake" does not have any associated parameters, and thus, the thermostat will not look for subsequent parameters. Instead, the "Awake" command will be translated into a command understandable by the thermostat so as to illuminate the display 48 of the thermostat 22. In another example, if a user says "Thermostat Show Outside Temperature", the thermostat may show the outside temperature on the display 48 of the thermostat 22 (and illuminate the display if the thermostat 22 was in sleep mode, which is an example of an action taken that may be required to perform the requested action). The thermostat 22 may also or alternatively speak the outside temperature. Other commands that cause other actions are contemplated. In some cases, the thermostat may have a learning mode, which may allow the user to associate a user defined voice "command" with a particular action to be taken by the thermostat 22.

In some cases, a user may define and/or the thermostat 22 (e.g., the voice recognition engine 46 or other feature) may learn a trigger phrase or command. For example, when the thermostat 22 is in a learning mode or in a different mode, a user may say a phrase or perform an action identifiable by the thermostat 22 (e.g., pressing a button and/or taking one or more other actions). The thermostat 22 may record (e.g., record at thermostat 22 or at a remote location) the phrase and/or action identifiable by the thermostat 22 and a user may associate one or more actions to be taken by the thermostat 22 (e.g., an action to be taken may be to place the thermostat 22 in a mode where it is waiting for a command after a trigger phrase is recognized, or one or more other actions) with the recorded phrase and/or action identifiable by the thermostat 22. There thermostat 22 may then automatically start performing the action associated with the created trigger phrase or command when the trigger phrase or command is identified. Alternatively, or in addition, the thermostat 22 may send one or more recorded phrases and/or recorded actions along with the associated action to be taken by the thermostat 22 to a remote location for consideration and/or approval by a third party.

In some instances, the thermostat 22 may associate phrases selected by a user from one or more of multiple trigger phrases or actions identifiable by the thermostat 22 that are supported by the thermostat 22 (e.g., "Hello", "Hello, Thermostat", pressing of a physical button, etc.) with one or more actions to be taken by the thermostat 22 therewith. Illustratively, a user could select one of multiple trigger phrases available on (e.g., supported by) the thermostat 22 and associate, or have the thermostat 22 automatically associate, initiating and/or activating voice control of the thermostat 22 such that voice control is initiated awaiting a command when the selected trigger phrase is identified by the thermostat 22.

The thermostat 22 or other device may record trigger phrases and/or commands spoken, but presently unsupported by the thermostat 22, and save (e.g., at the thermostat 22 and/or at a location remote from the thermostat 22) these recorded trigger phrases and/or commands for future analysis. In some cases, analytics and/or other analysis may be performed on the recorded trigger phrases and/or commands (e.g., audio files of these recorded trigger phrases and/or commands) and such an analysis may be utilized to add to a number of trigger phrases and/or commands supported by the thermostat 22 in response to perceived demand for certain functionality at the thermostat 22.

Alternatively, or in addition to using trigger phrases, the thermostat 22 itself may initiate voice control or initiate some other action in response to one or more different triggers. For example, a trigger that may initiate voice control of the thermostat 22 or some other action of the thermostat 22 may include, but is not limited to, a touch of a button, an activation of a proximity sensor, gesture sensing (e.g., via gesture sensing such as that commercially available by LEAP MOTION™), detection of a pattern of user interactions (e.g. a user provides a temporary hold for three mornings in a row, the thermostat may ask the user if the programmed schedule for the morning should be changed), and/or any other suitable trigger and/or action.

In instances when motion detectors and/or integrated infrared/optical sensors are included with and/or connected to the thermostat 22 (e.g. integral to the thermostat 22 or in communication with the thermostat 22), these detectors/sensors may sense a presence of one or more people, animals, and/or objects in a monitored area and/or measure surface temperatures and/or other conditions in the home via the infrared or optical sensor, or other types of sensors. In one example, if on-wall sensors of the thermostat 22 were to detect a person is warm or cold, the thermostat 22 may ask the user 62 or a home resident if they would like to make it warmer or cooler. In some instances, the thermostat 22 may automatically audibly ask a user 62 if the temperature should be increased or decreased due to one or more sensed temperatures of one or more persons, animals, or objects in the monitored area, and a user 62 may audibly respond with a command identifiable by the voice control system of the thermostat 22. Alternatively, or in addition, the thermostat 22 may automatically adjust the set points of the thermostat 22 in response to sensing a person, animal, or object is at a temperature level relative to a sensed ambient temperature (e.g., a threshold level) at which the thermostat 22 has been configured to make an adjustment. In some cases, the thermostat 22 may play a tone or display a message indicating it is sensing that a set point temperature should be adjusted in response to detecting a temperature of one or more persons, one or more animals (e.g., pets), and/or if one or more objects in use or non-use (e.g., an oven, freezer, etc.).

In some instances, voice control of the thermostat 22 may need the thermostat 22 to be connected to the internet via a wired or wireless connection or communication link 42 to utilize the voice recognition engine 46 in the cloud or for other purposes. When so provided, and in some cases, once the thermostat 22 or voice recognition engine 46 of the thermostat 22 identified a trigger phrase, the thermostat 22 may establish and/or check for an adequate connection to the internet 56 (e.g., a server in the cloud). In some instances, the thermostat 22 may need to connect to a service provider's server in the cloud (e.g., a web service such as Honeywell's TotalConnect™ server or another service provider's server), but this is not required in all embodiments. For example, when a voice recognition engine 46 is provided in the thermostat 22 that is capable of understanding trigger phrases and commands, the voice control of the thermostat 22 may not need to connect to the Internet 56 and/or a service provider's server in the cloud.

Figure 4:
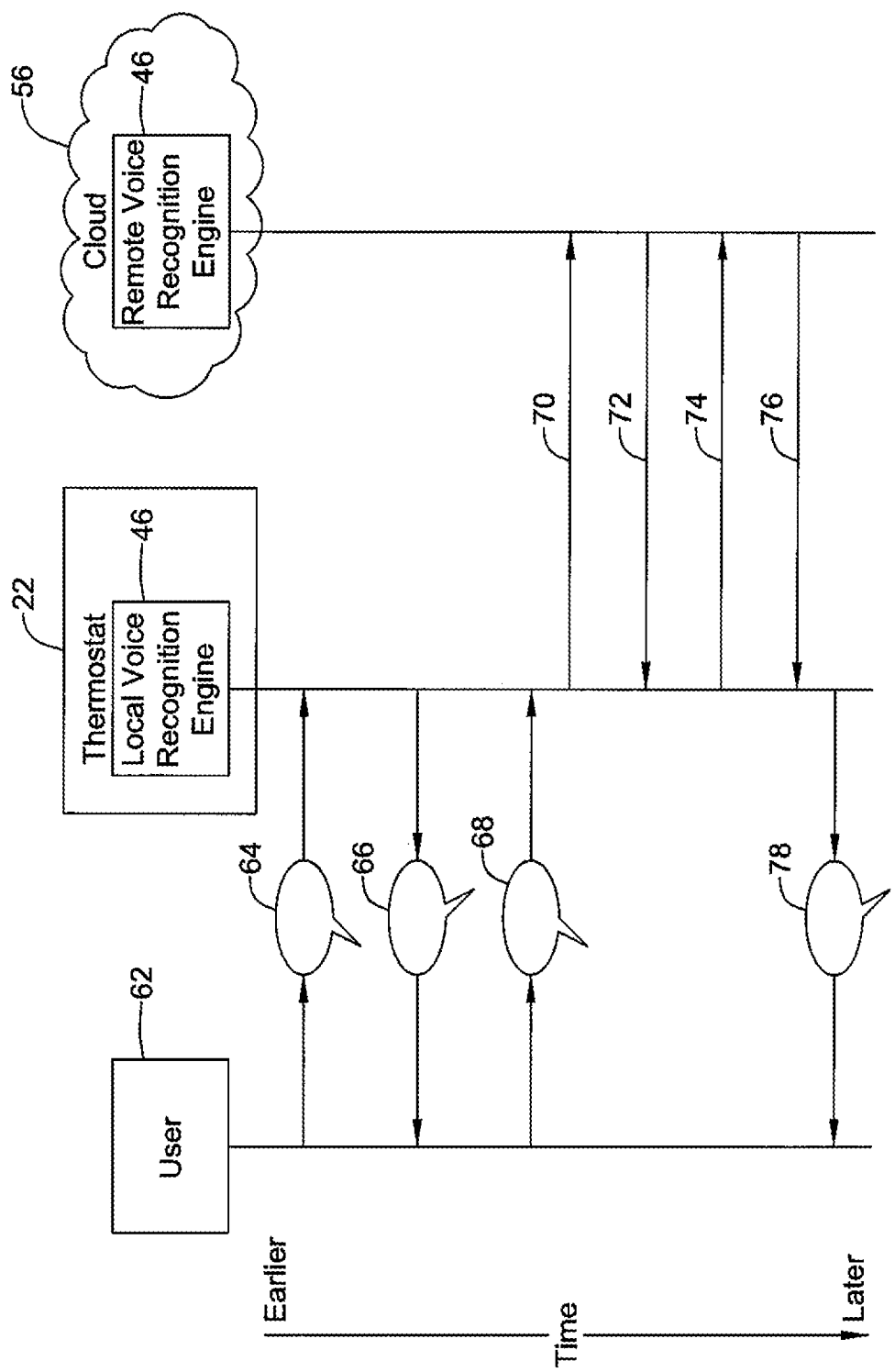
FIG. 4 is an interaction diagram showing illustrative interactions between a user, a thermostat, and the cloud.

FIG. 4 is an interaction diagram showing illustrative interactions between a user, a thermostat, and a server in the cloud. Initially, a user 62 may speak a trigger phrase 64 (e.g., "Hello Thermostat"), and the local voice recognition engine 46 at the thermostat 22 may recognize the trigger phrase 64 and respond to the user 62 with a request for a command 66 (e.g., "Please say your command" or other request) or other audio clip or message over the speakers 32. In response, the user may speak his/her command 68 (e.g., "Warmer", "I need help" or other command) and the thermostat 22 may record and/or stream 70 the voice message that includes the command 68 to a remote voice recognition engine 46 in the cloud 56 (e.g. on a server in the cloud) for recognition of the command.

In the example shown, the voice control system of thermostat 22 may stop recording audio and/or streaming audio to the cloud after a certain threshold has been met. For example, the thermostat 22 may stop recording audio and/or streaming audio to the cloud 56 after the voice control system in the cloud recognizes a command and notifies the thermostat 22 of the command, after a predetermined amount of time has elapsed since the voice control system of thermostat 22 started recording audio and/or streaming audio, after a predetermined amount of silence has elapsed, and/or after some other threshold has been met.

After receiving a recorded message and/or streamed message, the remote voice recognition engine 46 in the cloud 56 may recognize the command and change the command from a natural language audio format to a natural language text-based format, and then translate the natural language text of the user's command 68 into a command understandable by the thermostat 22. The voice recognition engine 46 of the cloud 56 may then transfer 72 the command understandable by the thermostat to the thermostat 22. In response to receiving the command from the cloud 56, the thermostat 22 may take the action dictated by the command (e.g., increase a set temperature or decrease a set temperature) and send 74 thermostat understandable feedback text indicating the action taken by the thermostat 22 (e.g., indicating the thermostat 22 increased the set point temperature by two degrees to seventy-two) to the voice recognition engine 46 in the cloud 56. The voice recognition engine 46 in the cloud may then send 76 a message to the thermostat 22 telling the thermostat 22 to play an audible natural language message 78 (and/or display a visual message on the display 48 of the thermostat 22) indicating the action taken by the thermostat 22. The thermostat 22 may then play the audible natural language message 78 (e.g., "Temperature set to seventy-two" or "Setting temperature to seventy-two") and/or display the text-based message on the display of the thermostat 22. In some cases, the message 76 may be a voice message (e.g., a wave file, MP3 or other file) that can be directly played by the thermostat 22. In other cases, the message 76 may be a text based message, and a text to voice translator may be in the thermostat 22 that translates the text based message to a voice message before playing the voice message to the user. In some cases, if voice control of the thermostat 22 is already initiated at the time of speaking a command (e.g. via a previous recognized trigger phrase), the trigger phrase may be omitted.

Prior to utilizing the voice control system of the thermostat 22, the voice control system may need to be configured on the thermostat 22. This configuration may be performed by an installer of the thermostat 22, a user of the thermostat 22, and/or may be set up at the time of assembly prior to end-user use of the thermostat 22. In some instances, the thermostat 22 may automatically initiate voice control configuration upon initial use and/or the configuration may be initiated by a user. To facilitate a user configuring voice control of the thermostat 22 without the need to review a user manual, the thermostat 22 may provide audio and/or visual help clips.

At any time during configuration and/or use of the voice control system, a user 62 may ask the voice control system for "help", and the voice control system may provide assistance. Illustratively, the voice recognition engine 46 may locally detect a voice command indicating the user needs help (e.g., "Help", "Need help with voice commands", etc.). In response to the locally recognized help command, the thermostat 22 may play a pre-recorded clip giving the user hints and/or instructions on how to operate the thermostat 22 and/or the voice control system of the thermostat 22. For example, when the thermostat 22 is not connected to the Internet and a user says a trigger phrase (e.g., "Hello thermostat", etc.) and/or a voice command (e.g., "I need help", etc.), such as "Hello thermostat, I need help", "Hello thermostat, could you help me?", "Hello thermostat, please advise", "Hello thermostat, full help", etc., the thermostat may respond with a first recording stating: "To enable voice recognition, you have to connect the thermostat to a Wifi network. Once you are done connecting, you can start operating the thermostat using voice commands", and/or a recording stating: "First, say hello thermostat and a wait a second. When asked, say your command". To list all possible commands, it is contemplated that a user may say: "Hello thermostat, list commands". In another example, when the thermostat 22 is connected to the internet and a user states a trigger phrase and/or a command, such as "Hello thermostat, I need help", "Hello thermostat, could you help me?", "Hello thermostat, please advise", etc., the thermostat 22 may play a recording that provides help, such as "First, say hello thermostat and a wait a second. When asked, say your command" or any other suitable recording. In another example, when the thermostat 22 is connected to the internet and a user states a trigger phrase and/or a command, such as "Hello thermostat, list commands", etc., the thermostat 22 may play a recording stating, for example: "You can say one of these voice commands: Warmer, Cooler, Set temperature to X degrees, What is the weather . . . ". In another example, when the thermostat 22 is connected to the internet and the user 62 states a trigger phrase and/or a command, such as "Hello thermostat, full help", the thermostat 22 may play these and/or other help clips. In yet another example, when the thermostat 22 is connected to the internet and a user 62 says a trigger phrase and/or a command "Hello thermostat, trouble shoot", "Hello thermostat, solve issues", etc., the thermostat 22 may play a recording such as: "Make sure your thermostat is connected to a Wifi network. Speak slowly and clearly. Each command has to start with a 'Hello thermostat' phrase—e.g., 'hello thermostat, make it warmer'. These are just some examples of help phrases commands a user 62 may use and some example recordings the thermostat may provide in response to the users help command. If voice control of the thermostat 22 is already initiated at the time of speaking a command (e.g. via a previous recognized trigger phrase), the trigger phrase may be omitted in some instances.

In some instances, in addition to or as an alternative to being played at user initiation, these recorded help hints and instructions may be played or displayed automatically when, for example, a feature is enabled on the thermostat 22 to let the user 62 know how to operate the enabled feature without having to search a user guide or other manual for instructions. This is one example of context sensitive help. It is contemplated that in some cases, the selection of a particular help clip to play may be based on the context of a particular user interaction.

Figure 5:
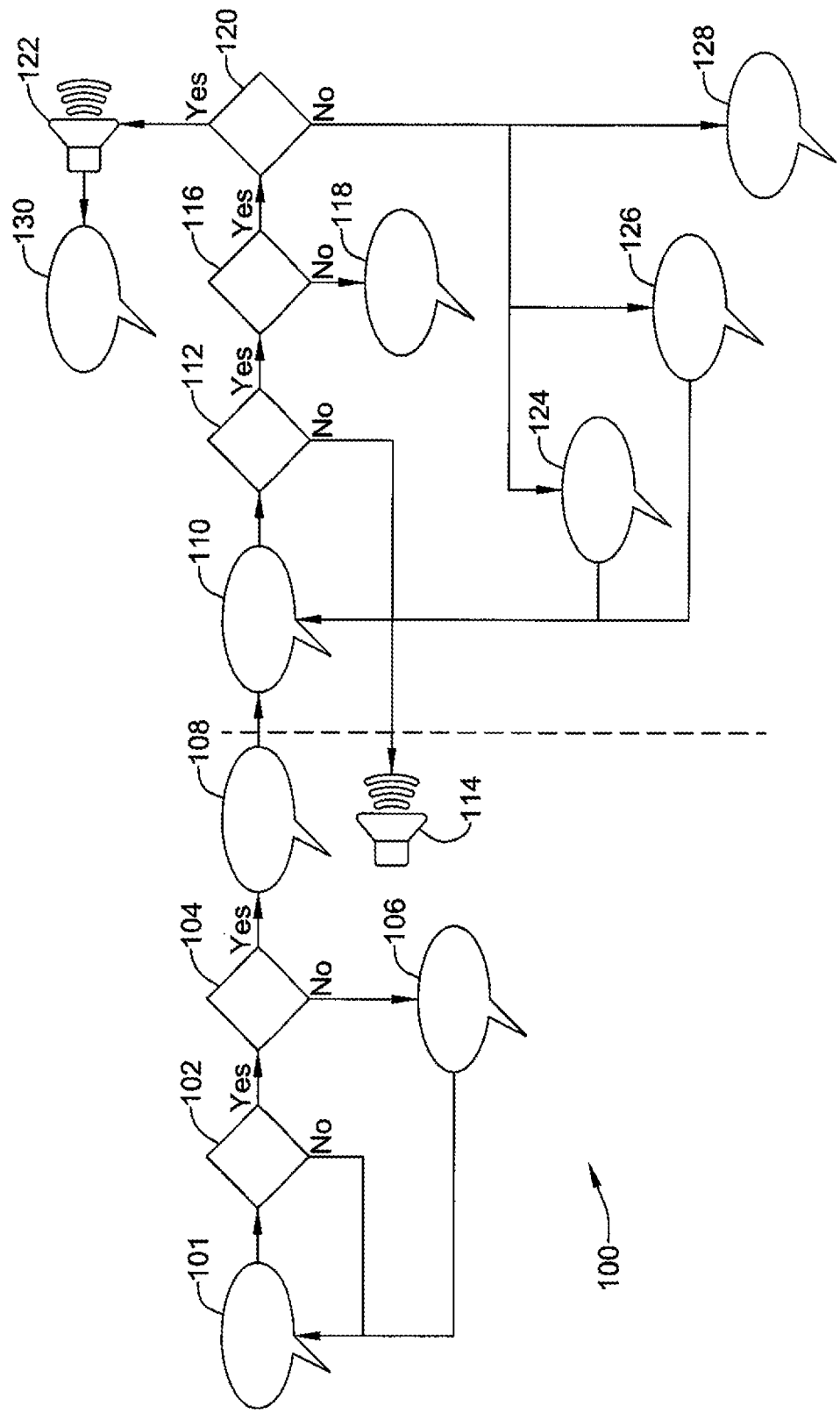
FIG. 5 is a schematic flow diagram of an illustrative process of using a voice control system.

In some instances, the thermostat 22 may be controlled with a voice control system by following a process 100, such as the process shown in FIG. 5. In the illustrative process 100, to activate voice control of the thermostat 22, a user may speak a voice stream that includes a voice control trigger phrase into the microphone 28 of the thermostat 22, as shown at 101, and the thermostat 22, using a voice control engine 46 that may be constantly or occasionally listening for a trigger phrase, may identify the voice control trigger phrase as shown at 102 within the received voice stream. In some cases, the thermostat 22 may include a voice recognition engine 46 which may process audio data from the microphone(s) 28 to identify the trigger phrase(s). In some cases, a voice message may be recorded by the thermostat 22 and sent to a voice recognition engine 46 located in the cloud 56 or streamed from the thermostat 22 to the voice recognition engine 46 located in the cloud 56, where the voice message may be remotely processed to identify the trigger phrase(s).

When the thermostat 22 is turned on or operating in any manner, the thermostat 22 may always be listening for a trigger phrase, as referred to above. In other instances, once voice control is turned on in the thermostat 22, the thermostat 22 may always be listening for a trigger phrase. Alternatively, the thermostat 22 may be set to listen for a trigger phrase after a certain action (which may be an inaction), after detecting a gesture or other movement, after a certain amount of time, and/or after any other suitable condition, as desired. In some cases, the thermostat 22 may be listening for a trigger phrase when it is in a sleep state and when it is in a wake state.

The trigger phrase identification sensitivity factor (e.g., an adjustable scale) of the voice control system of the thermostat 22 may be adjusted to balance false positives (e.g., where a false positive occurs when the voice control system thinks a trigger phrase was heard, but no trigger phrase was actually spoken) against false negatives (e.g., where a false negative occurs when the voice control system does not recognize a trigger phrase when a trigger phrase was actually spoken) in order to improve the accuracy of trigger phrase recognition. In order for the voice control system to perform such balancing, it can be beneficial for the voice control system to know when a false positive occurs and/or when a false negative occurs. In some instances, the voice control system may have commands that when spoken by a user 62 indicate to the voice control system that a false positive has occurred (or a false negative has occurred). Such commands (e.g., feedback) indicating when false positives and/or false negatives occur may be verbal commands (e.g. in response to a false positive, the user says "never mind"), may be an electrical command provided over a communications interface (e.g., serial, Ethernet, etc.), may be provided by physical interaction with the thermostat 22 (e.g. a button press), may be determined by context (e.g. in response to a false positive, no command follows), and/or may be provided in any other suitable manner. In response to being told when false positives occur (and/or when false negatives occur), the voice control system may automatically determine or suggest when a rebalancing of trigger phrase sensitivity might improve the performance of the system, and may make those changes automatically or on command.

Figure 19:
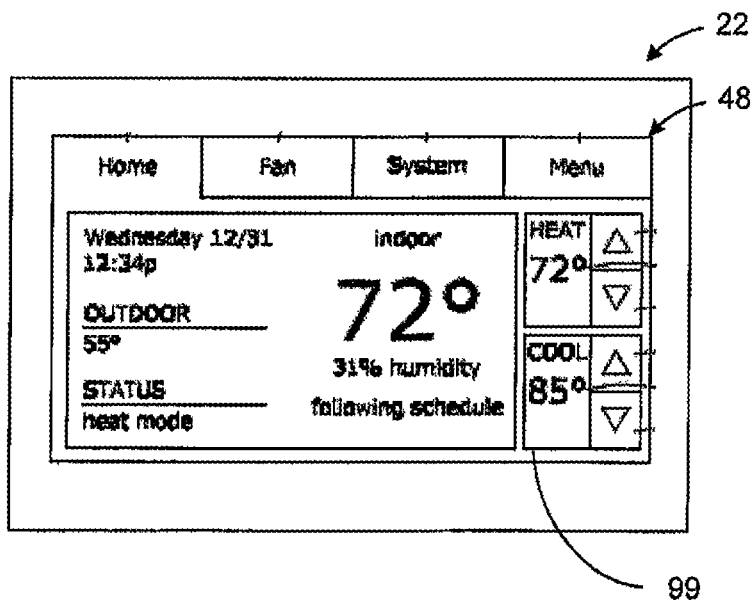
FIG. 19 is a schematic screen view of an illustrative screen of a thermostat.

After the thermostat 22 processes audio data and recognizes a trigger phrase, the thermostat 22 may perform an action, such as establishing and/or testing its connection to the Internet (e.g., testing its connection to a server in the cloud), as shown at 104. If there is "No connection", and the voice recognition engine 46 on the thermostat 22 is unable to process natural language commands (e.g., such as commands unrecognizable by the thermostat 22) into commands understandable by the thermostat 22, the thermostat 22 may indicate it is unable to operate via voice control and may default to a thermostat home screen 99 (e.g., see FIG. 19) or other screen indicating voice control is unavailable (e.g., see FIG. 6). In instances where there is "No connection", and the voice recognition engine 46 on the thermostat 22 is configured to process natural language commands into commands understandable by the thermostat 22, the voice control of the thermostat 22 may continue. In such instances where the local voice recognition engine 46 of the thermostat 22 is capable of processing natural language commands into commands understandable by the thermostat 22, the voice control system may be configured to use a remote voice recognition engine 46 when an internet connection is present and configured to use the local voice recognition engine 46 when there is no internet connection. In some instances, when there is "No connection", the local voice recognition engine 46 may process natural language commands into commands understandable by the thermostat 22, but at a reduced functionality relative to the remote voice recognition engine 46, until the connection is restored. For example, the local voice recognition engine 46 may only process a subset of commands relative to the remote voice recognition engine 46, such as simpler commands.

In addition to checking its connection to the Internet and/or the cloud 56, the thermostat 22 may perform one or more other operations or take one or more other actions in response to recognizing a trigger phrase. Other actions the thermostat 22 may take in response to identifying a trigger phrase may include, but are not limited to, initiating a voice control mode, emitting an audible message through the speaker(s) 32 of the thermostat 22 (e.g., where the audible message includes an indication that the voice control mode has been initiated), transitioning the thermostat 22 from a sleep state to a wake state, initiating a voice control mode, attempting to identify a voice command following the identified trigger phrase, displaying a home screen on the display 48 of the thermostat, performing one or more other actions, and/or performing any combination of the recited actions or one or more other actions.

As discussed, when the thermostat 22 has entered a sleep mode (e.g., a mode where the display 48 is powered down or is not illuminated), such as after a period of non-use or in response to a command, the thermostat 22 may awake from the sleep mode upon recognizing a trigger phrase (e.g., the thermostat may be set to always listen for a trigger phrase, even in a sleep or low power mode). Illuminating the display 48 of the thermostat 22 in response to recognizing a trigger phrase may allow a user to view the thermostat's actions taken when interacting with the thermostat 22, may allow a user to view the home screen or other default screen from across a room, and/or facilitate a user's interaction with the thermostat 22 (e.g. display that the thermostat 22 did or did not recognize the trigger phrase and/or that it is or is not taking an action in response to a voice command provided in the voice stream with the trigger phrase or in a voice stream separate from one including the trigger phrase).

Transitioning from a sleep state to a wake state may include transitioning from a lower power state of a sleep state for the thermostat 22 to a higher power state of a wake state for the thermostat 22. In one example, the display 48 of the thermostat 22 may include a backlight and/or other lighting system and the backlight and/or other lighting system may be turned off or dimmed when the thermostat 22 is in a sleep. Then, when the thermostat 22 is in a wake state, the backlight or other lighting system may be turned on or dimmed less than when the thermostat 22 is in a sleep state, which may be an indication that a voice control mode has been activated by the thermostat 22. As a result of entering the wake state, the thermostat 22 may be in a higher power state than when the thermostat 22 is in a sleep state and a lower power state. Additionally or alternatively, other power systems may be turned on and/or powered up when the thermostat 22 switches from sleep state to a wake state, which may affect the power usage levels of the thermostat 22. In some cases, the thermostat may be battery powered.

Figure 6:
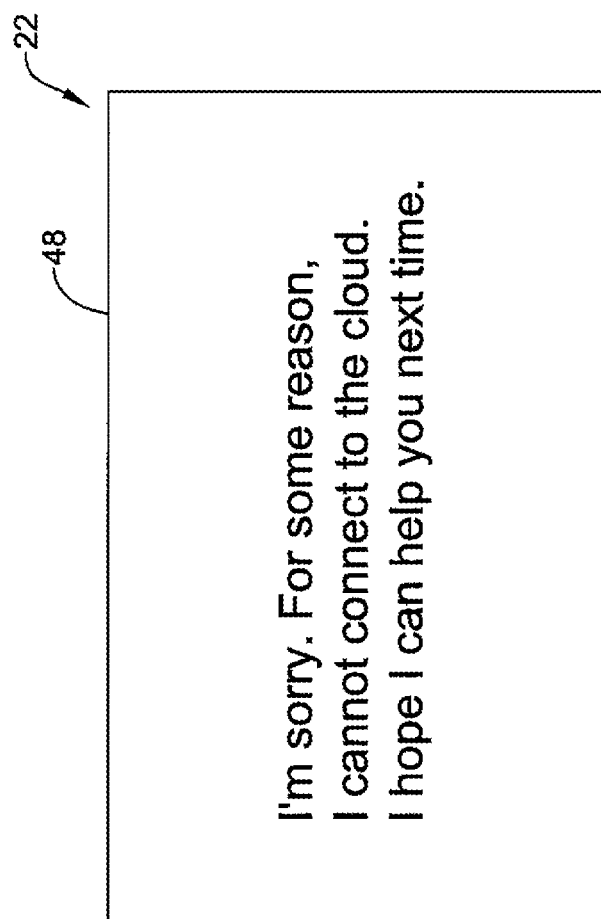
FIG. 6 is a schematic screen view of an illustrative screen of a thermostat.

As shown at reference 106 in FIG. 5, if the thermostat 22 is unable to connect to the Internet or a particular server connected to the Internet, the thermostat 22 may audibly speak through the speaker 32 and/or visually display on the display 48 a message such as "No connection. I'm sorry. For some reason, I cannot connect to the cloud. I hope I can help next time", or any other suitable word, phrase, and/or noise. An illustrative display 48 of the thermostat 22 displaying a text-based "no connection" message on the display is shown in FIG. 6.

Figure 7:
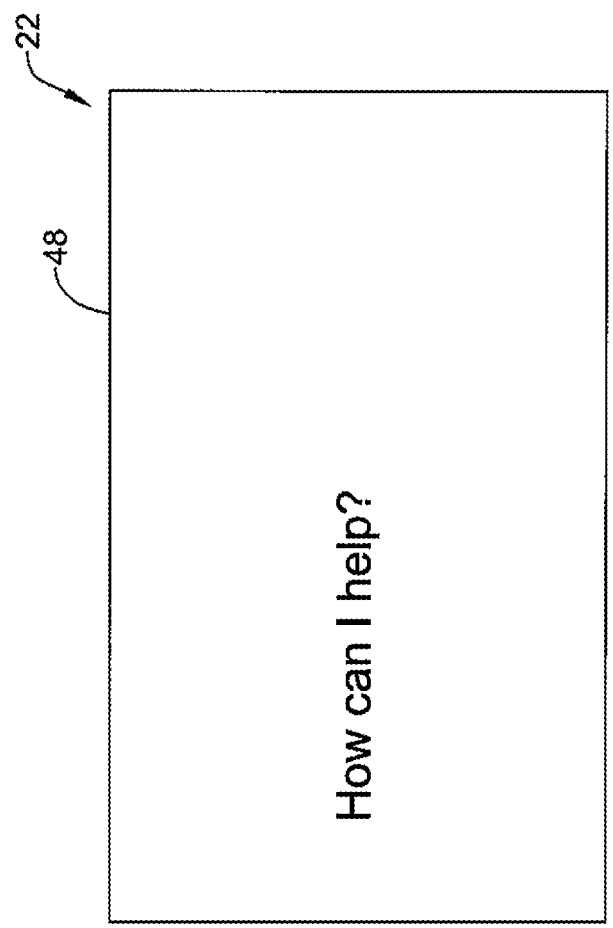
FIG. 7 is a schematic screen view of an illustrative screen of a thermostat.
Figure 8:
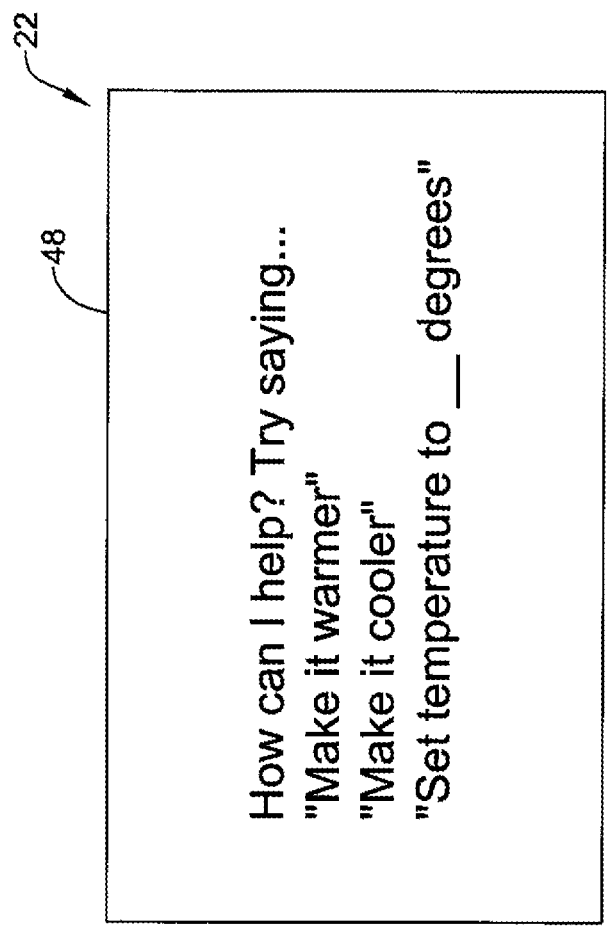
FIG. 8 is a schematic screen view of an illustrative screen of a thermostat.

If the thermostat 22 is able to connect to the Internet, the thermostat 22 may audibly speak a command request through the speaker 32 and/or visually display 108 on the display 48. The command request may be, for example, "How can I help?", "How can I help? Try saying . . . 'Make it Warmer' or 'Make it Cooler' or 'Set temperature to _____ degrees'", or any other suitable message. Illustrative displays 48 of the thermostat 22 displaying text-based commands that request messages are shown in FIGS. 7 and 8.

Once the thermostat 22 has indicated it is ready to accept a command by audibly and/or visually requesting information as to how the thermostat 22 may assist the user, a user may state a command word or phrase, as shown at 110 in FIG. 5. Alternatively, or in addition, the thermostat 22 may recognize a voice command in a same voice stream with a trigger phrase and indicate it is processing the voice command.

Figure 20:
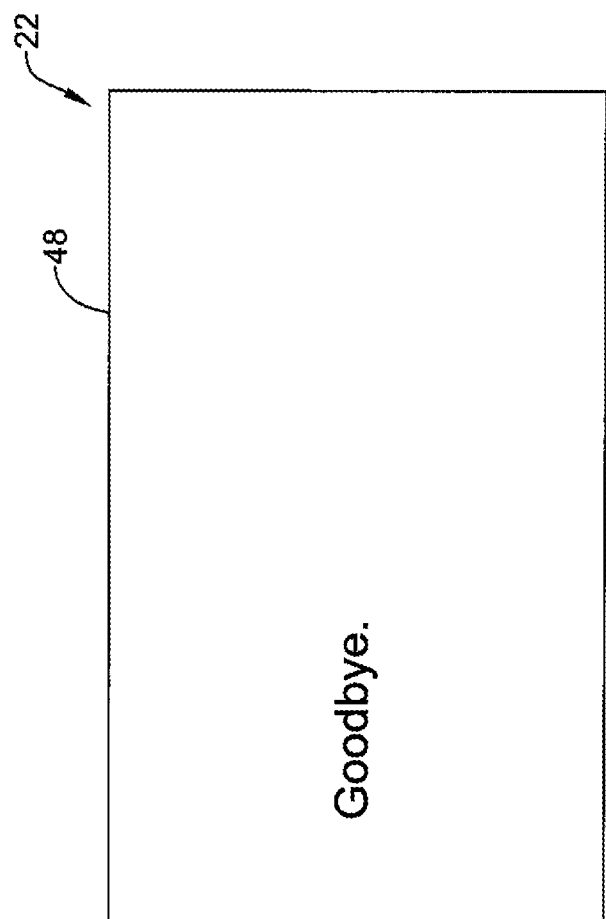
FIG. 20 is a schematic screen view of an illustrative screen of a thermostat.

When the thermostat 22 has requested a command from the user, the thermostat 22 may determine if it receives a translated command within an allotted time (e.g., within 5 second of requesting information, within 10 seconds of requesting information, within 20 seconds of requesting information, within 30 second of requesting information, within 45 seconds of requesting information) as shown at 112. If a user fails to state a recognizable command phrase in a set amount of time after the thermostat 22 requests information, the thermostat may time-out and the thermostat 22 may audibly speak and/or visually display 114 a message indicating voice control is ending 71 (e.g., "Timed out" and/or "Goodbye", see FIG. 20) and/or play a timed out tone.

Figure 21:
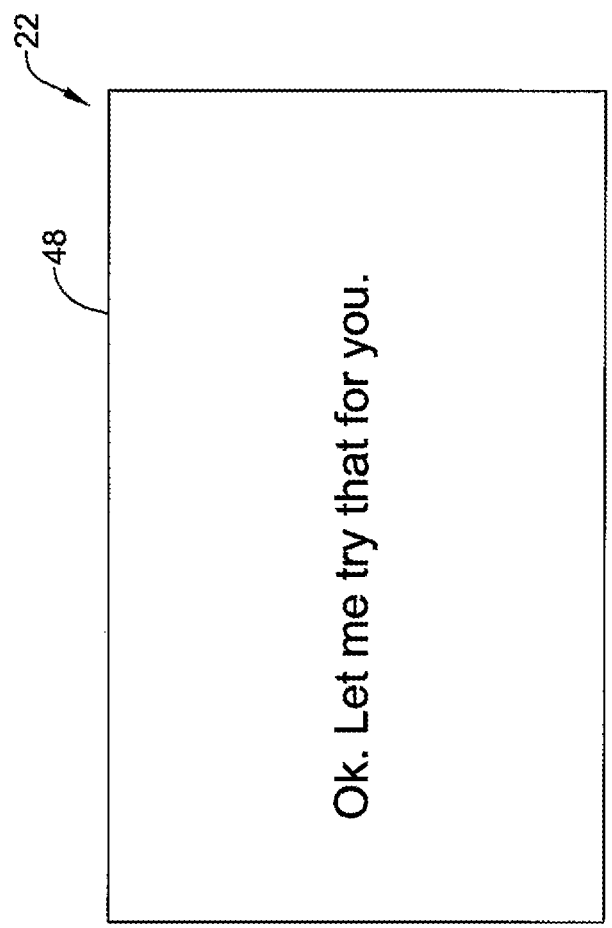
FIG. 21 is a schematic screen view of an illustrative screen of a thermostat.
Figure 22:
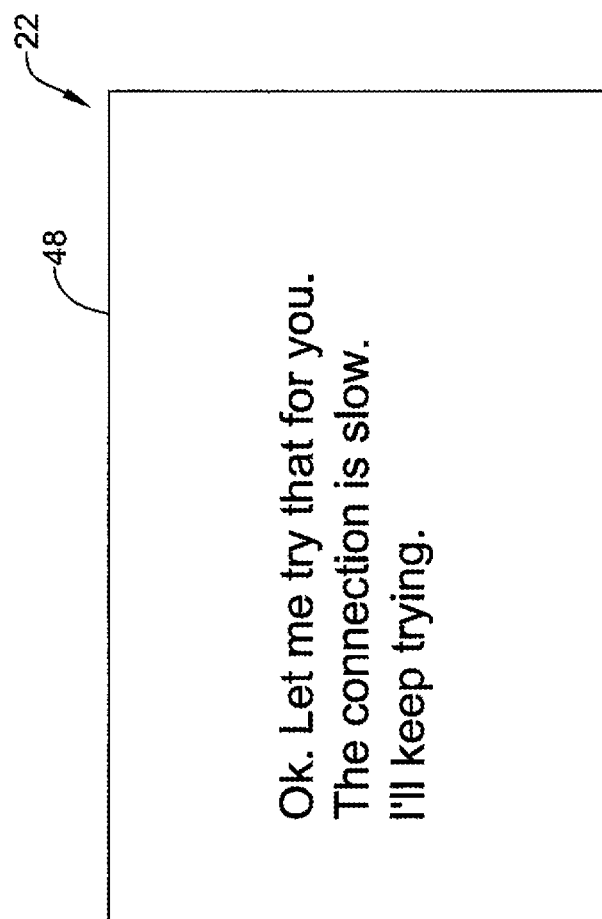
FIG. 22 is a schematic screen view of an illustrative screen of a thermostat.

If the user states a recognized command phrase within a specified amount of time, before some terminating threshold, at item 116 the thermostat 22 may attempt to send the identified command phrase to the Internet (e.g., a server in the cloud 56 identified by an Internet Protocol (IP) address), as shown in FIG. 5. If the thermostat 22 is unable to send the command phrase to the particular destination connected to the Internet (e.g., a service provider's cloud service), the thermostat 22 may audibly speak and/or visually display 118 "Cloud connection failure", "No connection", or "I'm sorry. For some reason I cannot connect to the cloud. I hope I can help next time" or any other suitable phrase (see FIG. 6). If the thermostat 22 successfully sends the command phrase to the particular destination connected to the Internet (e.g., a service provider's cloud service), the cloud service may attempt to process 120 the command phrase in the cloud 56. In response to processing the command phrase in the cloud 56, the thermostat 22 may play an audible tone (e.g., a processing tone) and/or display "One Moment Please" (see FIG. 15), "OK. Let me try that for you." (see FIG. 21), "Ok. Let me try that for you. The connection is slow. I'll keep trying" (see FIG. 22), or any other similar phrase as desired. In some cases, to indicate to a user that the command is being processed, the thermostat 22 may play a tone or display 122 a processing message or icon for a set period of time (e.g., 2 second, 4 seconds, 10 seconds). In some instances, the tone or message may be displayed for a set period of time regardless of how long it takes to process the command phrase, or, alternatively, the thermostat 22 may play the tone or display 122 a processing message for the amount of time needed to process the command phrase.

Figure 9:
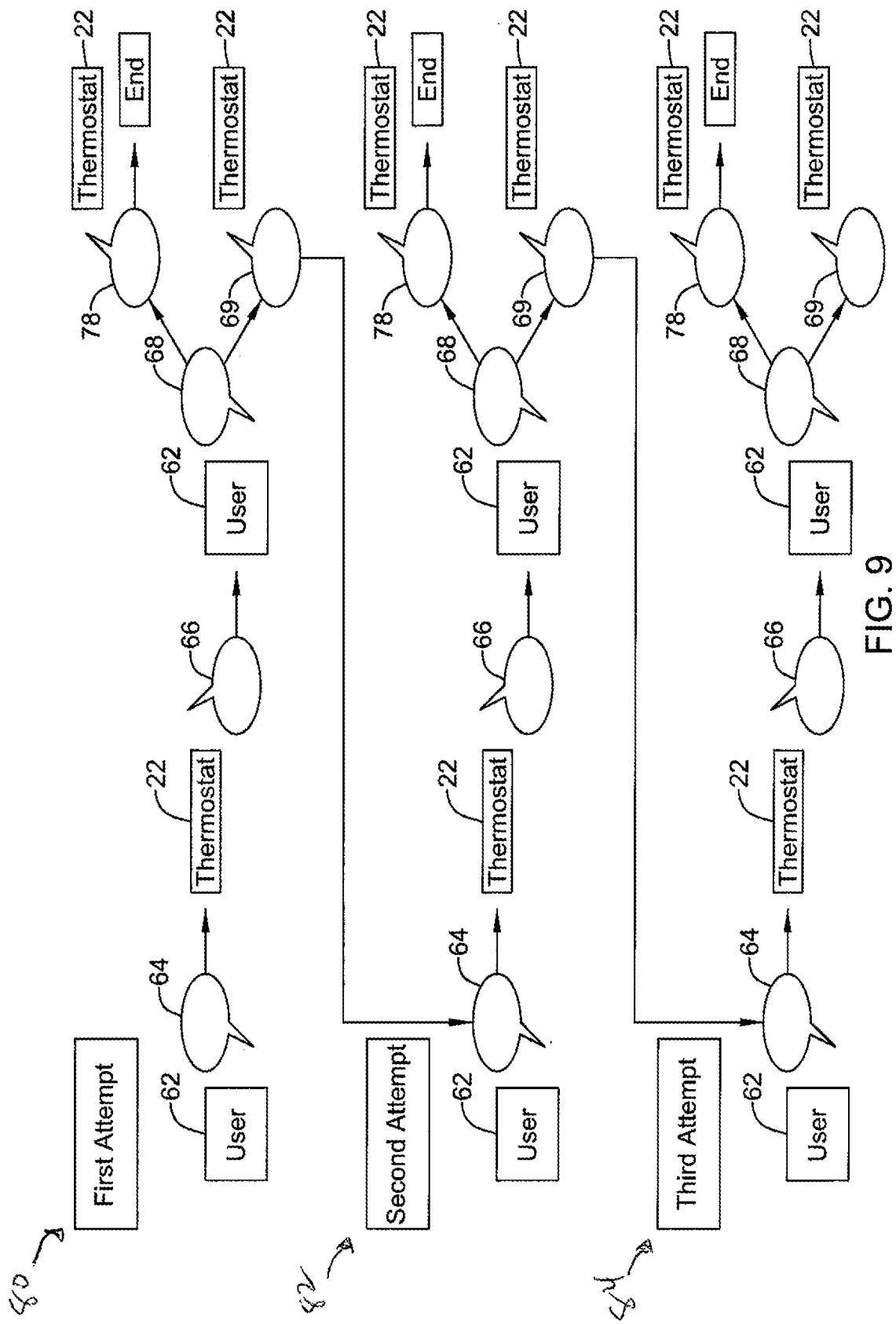
FIG. 9 is a schematic flow diagram showing an elevated help feature.

In some instances the cloud service may not understand the command provided to it by the thermostat 22 and/or remote device 25, and may then provide elevated help to the user, as discussed herein (see FIG. 9). In response to the first time the cloud service is unable to recognize a command phrase, the thermostat 22 (or remote device 25) may audibly speak and/or display 124 "Unrecognizable command—1$^{st}$ attempt" or "No Recognition" or "I'm sorry can you try again?" or any other suitable phrase, and request a user to speak 110 a further or repeated command phrase (see FIG. 10). In response to a second time in a row that the cloud service is unable to recognize a command phrase, the thermostat 22 (or remote device 25) may provide audible (and/or visual) feedback to the user 62 on how to state a command (e.g., "You can say . . . Warmer, Cooler"), and request that the user speak a further or repeated command phrase 110 (see FIG. 11). In response to a third time in a row the cloud service is unable to recognize a command phrase, the thermostat 22 may audibly speak and/or display 126 "Unrecognizable command—3$^{rd}$ attempt (final)" or "No Recognition" or "Voice control terminated" or "Goodbye" or any other suitable phrase (see FIGS. 12 and 20). Although three levels of attempting to present a processable or understandable command phrase is presented before the voice control system terminates, any number of levels greater than or less than three (3) levels may occur before the thermostat 22 ends the voice control process. In some cases, after the first, second and/or third attempt, the thermostat 22 (or remote device 25) may automatically display a visual help message, or provide an audio and/or video help message, to assist the user in properly providing a recognizable command.

Once a command phrase is received, recognized and processed, the thermostat 22 may audibly speak and/or visually display 130 "Confirmation", or may indicate the result of the command or the action taken by the thermostat 22 ("The Temperature Setting Has Been Increased to 74 Degrees" or "New temperature is set" (see FIG. 16)), if desired.

In instances where the voice recognition engine 46 in the thermostat 22 does not recognize or may not be able to interpret a spoken command as being a command, the thermostat 22 may speak and/or display "How can I help? Try saying . . . 'Make it Warmer' or 'Make it Cooler' or 'Set temperature [1 . . . 10] degrees warmer/cooler'" or any other suitable message. An illustrative display 48 of the thermostat 22 displaying a text-based message after a first failed recognition of a command is shown in FIG. 8 (where the display of FIG. 8 may be displayed initially when requesting a command and/or after a first failure of identifying a command).

In some instances, assistance from the thermostat 22 may be provided when the thermostat 22 recognizes, on its own, that a user needs help in saying a command, configuring the thermostat 22, and/or otherwise operating the thermostat 22. In some instances, the thermostat 22 (e.g., the voice recognition engine 46) may recognize a predetermined audible trigger via the microphone 28 as indicating a user needs help or assistance. For example, an audible trigger may include an audible trigger phrase (e.g., a trigger phrase including the term "HELP" or other wording) and/or an audible trigger phrase followed by one or more of a plurality of audible trigger commands. Alternatively or in addition to identifying an audible trigger, the thermostat 22 may sense that a user may need help assistance and/or assistance in view of one or more actions (e.g., including inactions) by user when interacting with the thermostat 22. For example, the thermostat 22 may determine a user may need assistance or help when an audible trigger phrase is detected, but an audible command is not detected following the audible trigger phrase. In some cases, a user may manually interact with one or more buttons of the thermostat 22 (e.g., where buttons of the thermostat 22 may include one or more touch areas on the display 48, one or more push buttons, and/or touch areas separate from the display 48) through which the thermostat 22 may identify that the user needs help and/or assistance interacting with the thermostat.

When the thermostat 22 recognizes a user needs assistance or help, the thermostat 22 may automatically provide assistance via a helpful visual message, a helpful audio message (e.g., an audio clip), a helpful video message (e.g., a video clip), and/or the like. Whether the thermostat 22 recognizes an audible trigger or an action taken by a user, the voice recognition engine 46 may provide the same and/or different visual clips, audio clips, and/or video clips in response to different identified audible triggers and/or actions by a user. In some instances, the thermostat 22 may play one or more helpful visual messages, audio messages, and/or video messages in response to and corresponding to an activation of a feature of the thermostat 22 that was previously disabled or deactivated (e.g., where the thermostat 22 may have one or more disabled features at any given time that are capable of being enabled and/or activated), and/or when turning on the thermostat 22 (e.g., where the played one or more helpful visual messages, audio messages, and/or video messages may correspond to assisting a user with initial setup of the thermostat 22 or one or more features thereof).

In one example of the thermostat 22 assisting a user, the thermostat 22 may identify a user having trouble interacting with the voice control system, and may provide elevated levels of help depending on the circumstances, as illustrated in FIGS. 9-12. In some instances, when the thermostat 22 recognizes that a user has failed to successfully communicate a command during a first attempt 80, the thermostat 22 may provide audio (and/or visual) feedback (e.g., "Please try again" or "I'm sorry. Can you try again?", such as shown in FIG. 13). If the thermostat 22 recognizes that a user has failed to successfully communicate a command during a second attempt 82, the thermostat 22 may provide audible (and/or visual) feedback to the user 62 on how to state a command (e.g., "You can say . . . Warmer, Cooler"). If the thermostat 22 recognizes that a user has failed to successfully communicate a command during a second attempt 82, the thermostat 22 may provide audible (and/or visual) feedback to the user 62 that the voice control system is quitting and the problem will be noted (e.g., "Problem will be recorded"). Although FIG. 9 indicates each attempt at stating a command begins with a user 62 reciting a trigger phrase 64. However, in some cases, after a first attempt 80, it may not be necessary to state a trigger or trigger phrase 64 because voice control has already been initiated.

Figure 10:
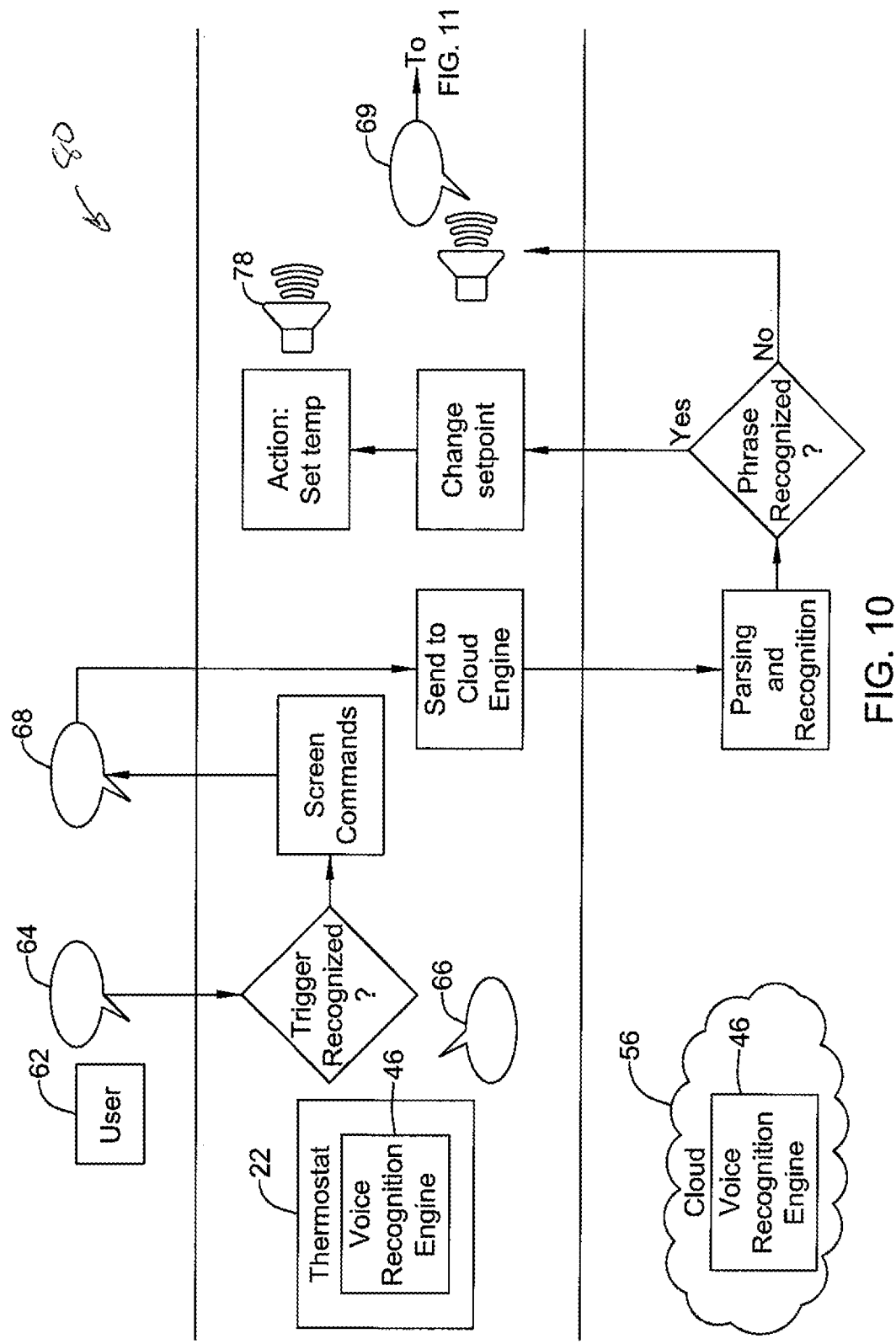
FIG. 10 is an interaction diagram showing illustrative interactions between a user, a thermostat and the cloud during the first attempt of FIG. 9.
Figure 14:
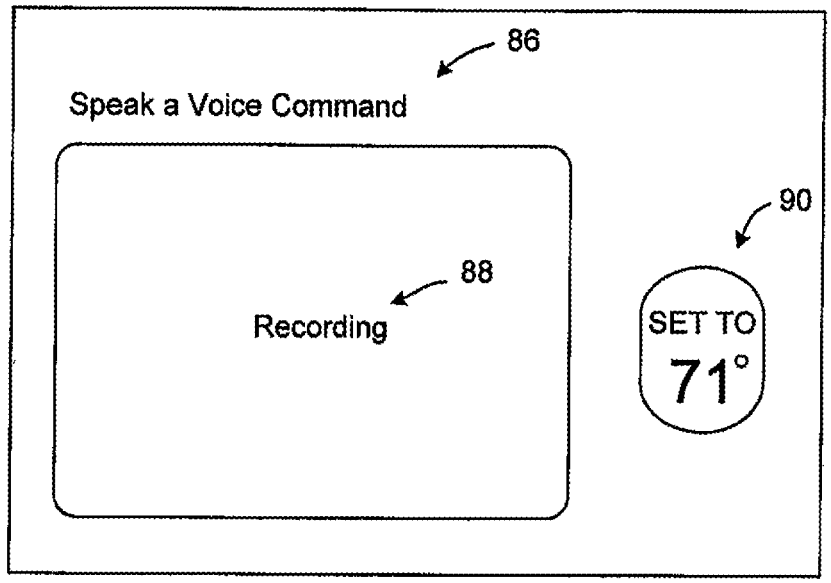
FIG. 14 is a schematic screen view of an illustrative screen of a thermostat.
Figure 15:
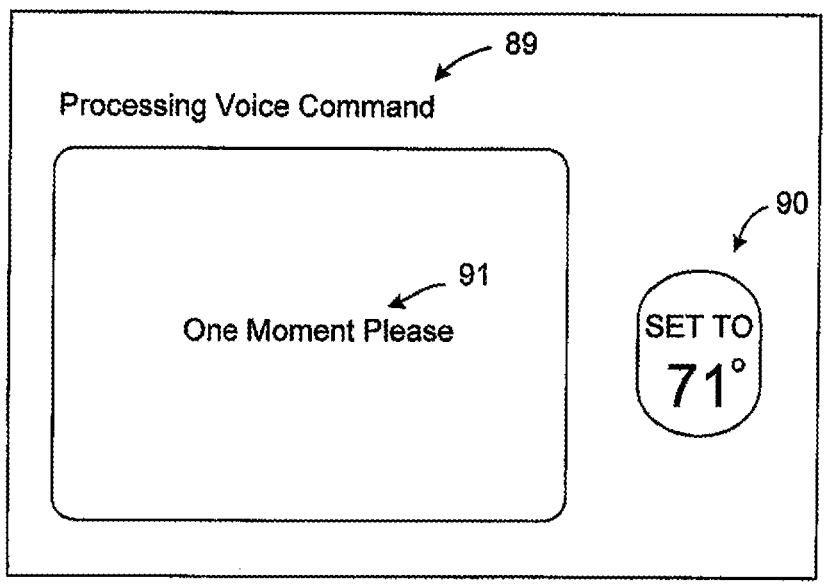
FIG. 15 is a schematic screen view of an illustrative screen of a thermostat.
Figure 16:
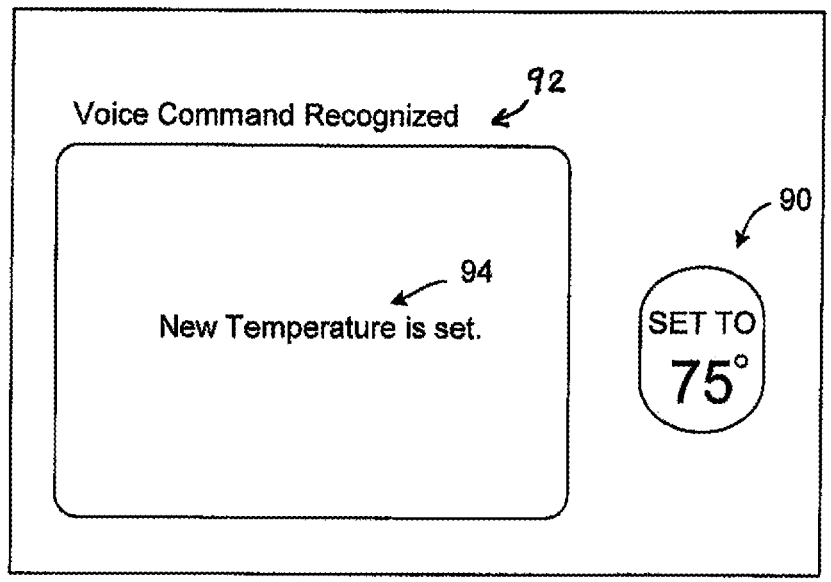
FIG. 16 is a schematic screen view of an illustrative screen of a thermostat.
Figure 17:
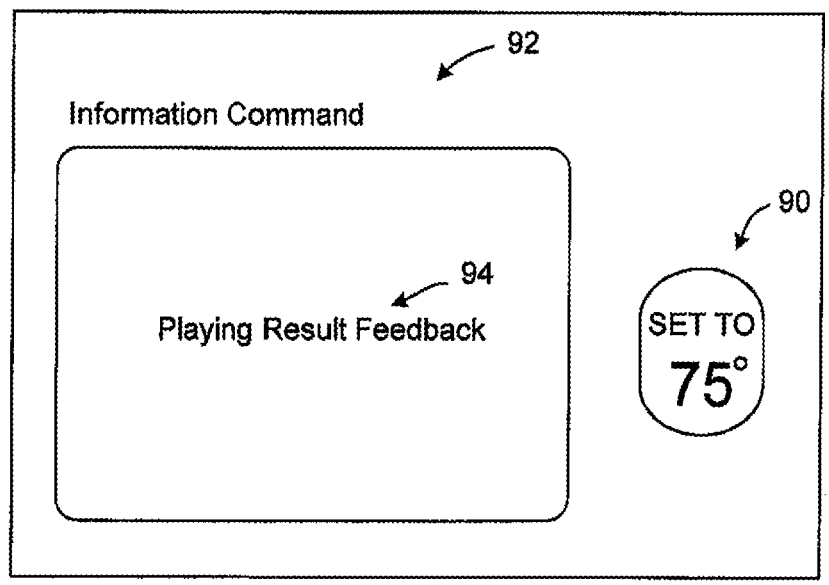
FIG. 17 is a schematic screen view of an illustrative screen of a thermostat.

FIG. 10 shows a schematic flow diagram of interactions between the user 62, the voice recognition engine 46 on the thermostat 22, and the voice recognition engine 46 in the cloud 56 during a first attempt 80 of stating a command. As discussed above, to initiate voice control of the thermostat 22, the user 62 may say a trigger phrase 64 and the voice recognition engine 46 at the thermostat 22 may recognize the trigger phrase 64. In response to recognizing the trigger phrase (or other trigger), the thermostat 22 may play an audible natural language message 66 (e.g., "Please say your command") and/or display a natural language text-based message 86 requesting the user 62 to say a command (e.g., "Speak a Voice Command"), as shown in FIG. 14, along with an indication that the thermostat 22 is recording 88 and/or streaming audio, and sometimes a display of the current set point temperature 90. In some instances, the command spoken by the user 62 may then be transferred (e.g., recorded and/or streamed) to the voice recognition engine 46 in the cloud 56 or otherwise remote from the thermostat 22 for processing and recognition as a command. FIG. 15 shows an illustrative screen of the display 48 of the thermostat 22 displaying an indication that the voice command is being processed 89 (e.g., "Processing Voice Command") and a text-based message asking the user 62 to wait while the command is being processed 91 (e.g., "One Moment Please"). If the spoken command from the user 62 is recognized, a message may be sent to the thermostat 22 from the cloud 56 instructing the thermostat 22 to perform an action in response to the command and to audibly play 78 and/or visually display an indication of the action taken by the thermostat 22. FIG. 16 and FIG. 17 show illustrative screens of the display 48 of the thermostat 22 displaying indications that the voice command was recognized 92 (e.g., "Voice Command Recognized", "Information Command") and a message of the action taken 94 by the thermostat 22 (e.g., "New temperature is set", "Playing Result Feedback), where FIG. 16 is a screen in response to a temperature set point related command and FIG. 17 is a screen in response to a non-temperature set point related command (e.g. information command).

Figure 18:
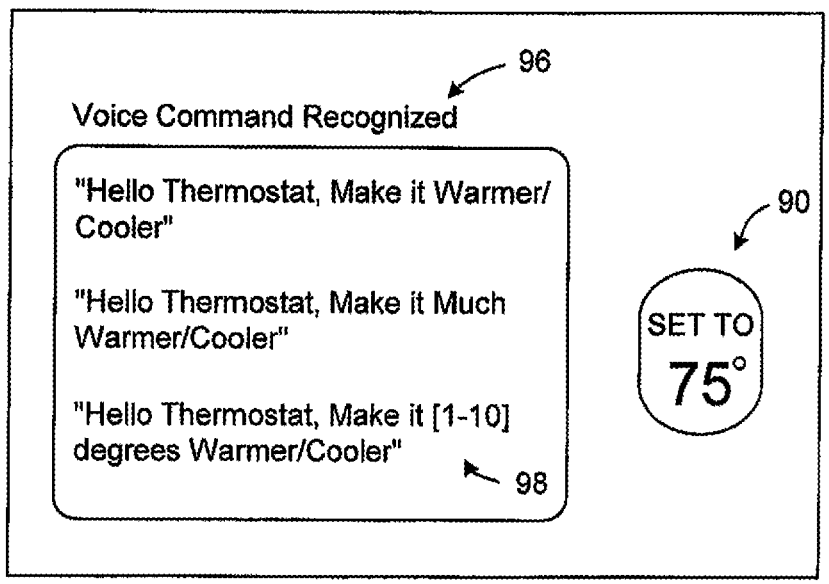
FIG. 18 is a schematic screen view of an illustrative screen of a thermostat.

If the command 68 from the user 62 is not recognized by the voice recognition engine 46 in the cloud 56, the remote voice recognition engine 46 may send a message to the thermostat 22 to audibly play and/or visually display a message 69 indicating the command 68 was not understood, and to ask the user 62 to try speaking the command again. FIG. 13 shows an illustrative screen of the display 48 of the thermostat 22 displaying a message 69 that indicates that the command 68 was not understood, and asking the user 62 to try speaking the command again (e.g., "I'm sorry. Can you try again?"). FIG. 18 depicts an alternative illustrative screen of the display 48 of the thermostat 22 displaying a message 96 that indicates that the command was not understood, while providing a text message with example commands 98 (e.g., "Hello Thermostat, Make it Warmer/Cooler", "Hello Thermostat, Make it Much Warmer/Cooler", and "Hello Thermostat, Make it [1-10] degrees Warmer/Cooler").

Figure 11:
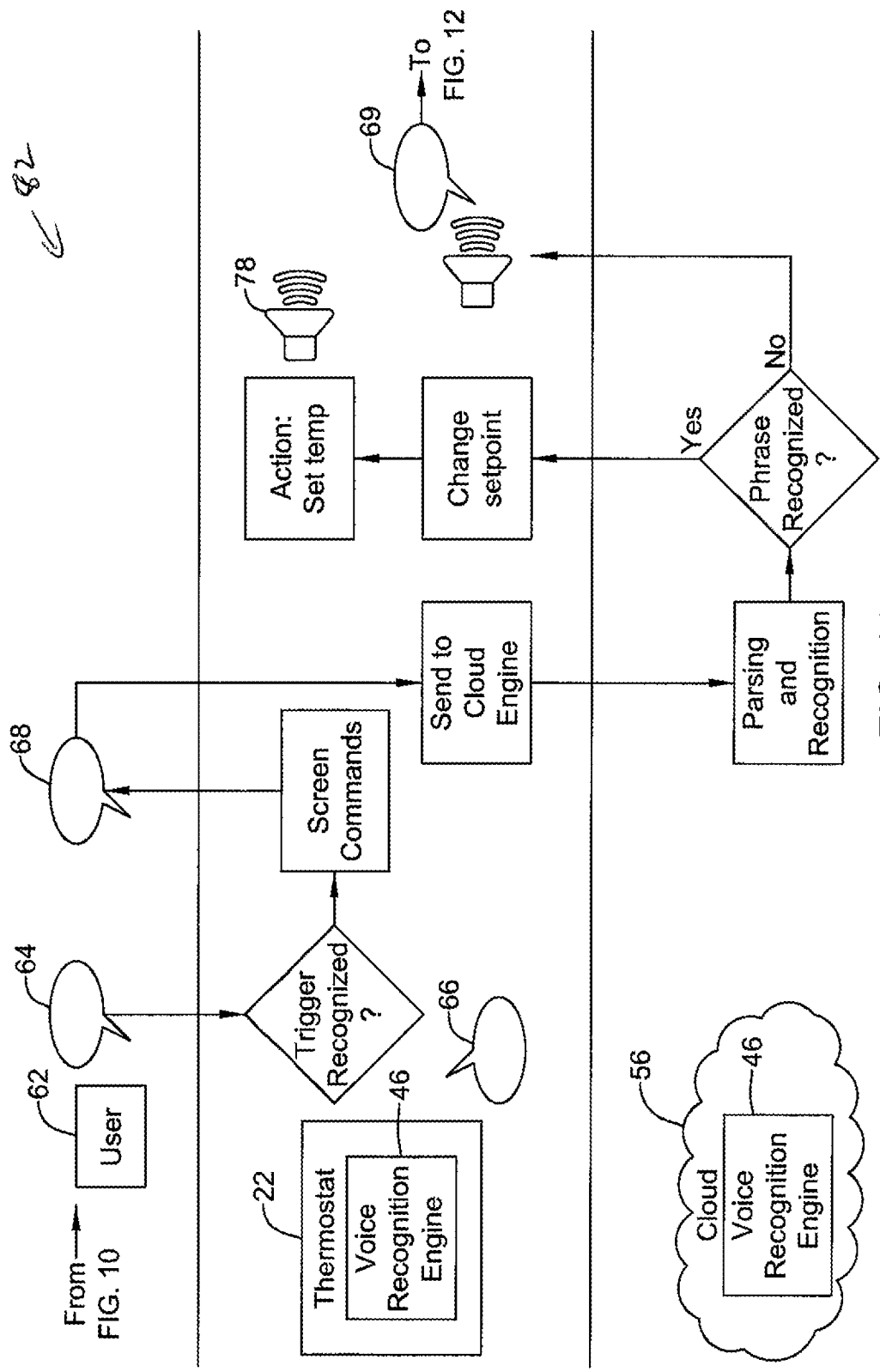
FIG. 11 is an interaction diagram showing illustrative interactions between a user, a thermostat and the cloud during the second attempt of FIG. 9.

FIG. 11 shows a schematic flow diagram of interactions between the user 62, the voice recognition engine 46 on the thermostat 22, and the voice recognition engine 46 in the cloud 56 during a second attempt 82 of stating a command. If the command 68 from the user 62 is not recognized by the voice recognition engine 46 in the cloud 56 during the first attempt, the remote voice recognition engine 46 may send a message to the thermostat 22 to audibly play and/or visually display a message 69 that may provide additional help or assistance. For example, the thermostat 22 may provide audible (and/or visual) feedback to the user 62 on how to state a command (e.g., "You can say . . . Warmer, Cooler").

Figure 12:
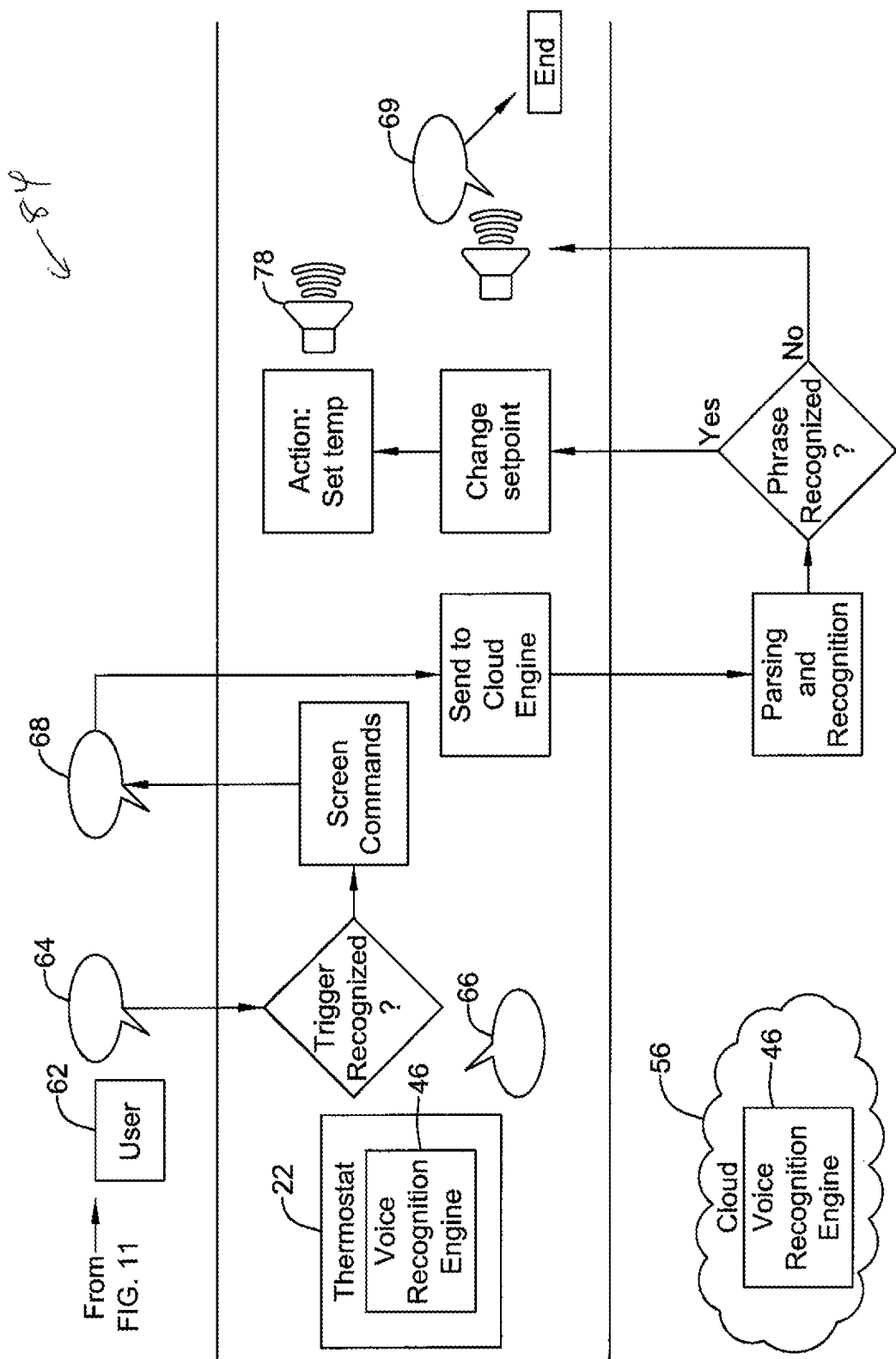
FIG. 12 is an interaction diagram showing illustrative interactions between a user, a thermostat and the cloud during the third attempt of FIG. 9.
Figure 13:
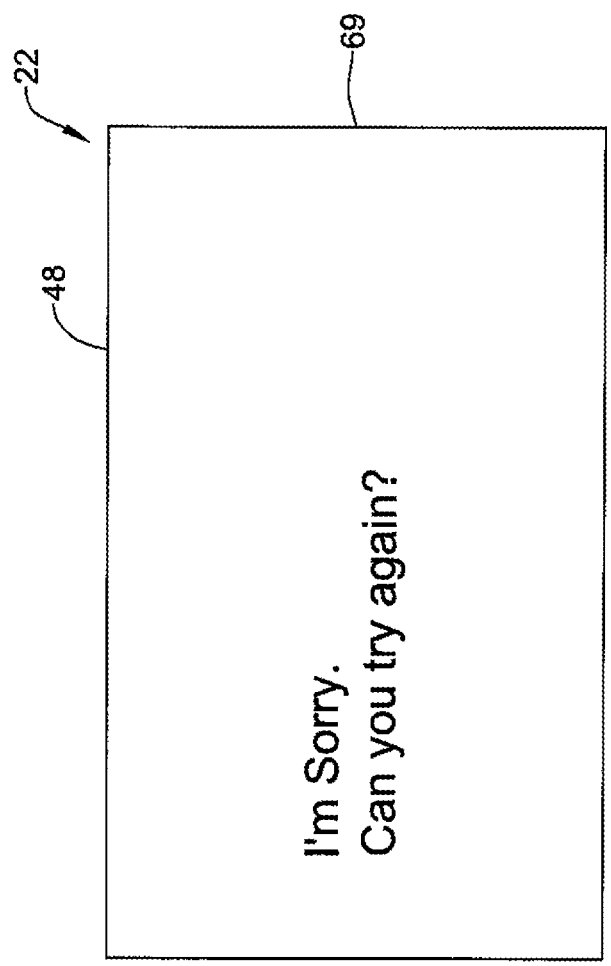
FIG. 13 is a schematic screen view of an illustrative screen of a thermostat.

FIG. 12 shows a schematic flow diagram of interactions between the user 62, the voice recognition engine 46 on the thermostat 22, and the voice recognition engine 46 in the cloud 56 during a third attempt 84 of stating a command. If the command 68 from the user 62 is not recognized by the voice recognition engine 46 in the cloud 56 or remote from the thermostat 22 during the second attempt, the remote voice recognition engine 46 may send a message to the thermostat 22 to audibly play and/or visually display a message 69 that the thermostat is having difficulty understanding the command and that the problem is being recorded for troubleshooting purposes.

Other levels of help are contemplated in response to the same and/or various issues with which a user may require assistance or help during use of the voice control system. In addition to the thermostat 22 being able to recognize when a user needs assistance or help, and being able to provide the needed help, help or assistance may be available to a user on demand by saying "Help" or by selecting a help icon or button on the thermostat 22. The help provided by the thermostat may be offered at and/or on the thermostat 22 and/or on a remote device 25. For example, to help a user, the thermostat 22 may display a series of images showing steps of a process, the thermostat 22 may speak the steps of the process and/or audibly interact with a user to determine a root cause of an issue. The thermostat 22 and/or remote device 25 may play video explaining a process, the thermostat 22, if connected to the internet, may bring a user to a website showing how to use a feature of the thermostat and/or service, and/or the thermostat 22 may provide help to a user in any other suitable way, as desired.

When help is initiated or at other times during the use of the voice control system of the thermostat 22, the server 58 in the cloud 56 may gather data about user help queries while operating the thermostat 22. Statistical analysis may be performed on the gathered data to identify areas of the voice control system that may be improved or changed to increase the usability of a particular thermostat 22 or the usability of the voice control system in general. In this way, the voice control system may be improved.

In some instances, the thermostat 22 may interact with a user 62 by asking questions of the user 62. For example, if the user 62 is to tell the thermostat that the user 62 is going on vacation, the thermostat 22 may reply with "Ok. Would you like to set a vacation mode?". If the user responds with "Yes", the thermostat 22 may respond with "When are you leaving?". If the user response with "This Friday", the thermostat may respond with "When will you return?". If the user responds with "Next Tuesday", the thermostat 22 may respond with "What temperature would you like to set while you are on vacation?". If the user responds with a temperature such as "68", the thermostat may program a vacation mode of the thermostat using the information provided by the user. This is just one example. More generally, the voice control system of the thermostat 22 may be capable of conversational interactions with the user to set various modes, settings and/or systems of the thermostat, as desired.

The thermostat 22 may be capable of auto learning a user's comfortability with the voice control system. Illustratively, the thermostat 22 may automatically learn or identify a user's 62 interaction and experience level with the voice control system (and/or the thermostat 22) through the user's voice control systems interactions with the thermostat 22. Various factors may be utilized to determine a user's experience level including, but not limited to, an amount of successful commands provided by a user in a row, an amount of interactions with the voice control system by the user, a number of days in a row in which the user interacts with the voice control system, etc. In one example, at various points of a user's 62 experience journey, the thermostat 22 may recommend or suggest to the user 62 to move to a more advanced voice control mode (e.g., an expert mode) of operating the thermostat 22. The user may then acknowledge the recommendation or suggestion and opt to move up a level, move down a level, or stay at the same level. Generally, the thermostat 22 may automatically adjust the experience level at which it interacts with the user 62 or it may provide the recommendation to move up or down an experience level based on a sensed experience level of the user 62. In some instances, an auto-learning thermostat 22 may simplify voice interaction and voice control by limiting the amount of voice control options provided to a user 62 when the user 62 is at a low experience level and by increasing the amount of voice control options provided to the user 62 when the user 62 is at a high experience level. Alternatively or in addition, the voice control system of the thermostat 22 may provide more assistance or help to a user at a low experience level and less help or assistance to a user a high experience level.

The thermostat 22 may allow for the setting up of and use of user profiles of authorized users of the thermostat 22. Users 62 may be able to setup their own comfort profile on the thermostat 22 via the voice control system and the thermostat 22 may be able to auto learn each user's 62 voice control system comfortability level and store that voice control system comfortability level in their user profile. In some examples, a user's profile may include one or more of a user's 62 preferred program mode, voice control system comfortability level, preferred temperature settings, preferred vacation settings, preferred home and away settings, calendar, etc. Each profile may have the ability to be password protected such that the voice control system may be capable of recognizing their password. In similar or other instances, the thermostat 22 may recognize a user's voice and/or may have one or more other sensors (e.g., finger print sensor, eye/retina scanner, facial recognition scanner, etc) to recognize a user and set the thermostat 22 to the identified user's profile.

In some cases, the thermostat 22 and/or cloud service may train a user on how to use the voice control features. As users may be reluctant to read documentation provided in conjunction with the thermostat 22 on how to use the voice control system, and as it may be difficult to accurately describe how to use the voice control system, the thermostat 22 may provide audio and/or visual tutorials on how to use the voice control system to operate the thermostat 22. The training and/or help features of the thermostat 22 may be available upon start up of the thermostat 22 and/or upon configuration of the voice control system (e.g., when the voice control system is toggled "on" or turned on in any other manner). Additionally or alternatively, the training and/or help features of the thermostat 22 may be available upon request while utilizing the voice control system by speaking "Help" or some other phrase into the microphone 28 of the thermostat 22, or by selecting a help or other button from the user interface 26 of the thermostat 22, as discussed above. In some instances, context sensitive help information may be provided when the system recognizes that the user is having trouble, such as when the thermostat 22 is having trouble recognizing the user's voice commands. The training system of the thermostat may be designed to provide audio and/or visual training/help at the thermostat 22 (and/or remote device 25), sometimes without referring the user to a website remote from the thermostat 22 and/or without referring the user to a user manual for the thermostat 22.

The thermostat 22 may be able to walk a user 62 through a set of audio and/or video queues that teach or explain how to configure the thermostat 22 to control a specific HVAC system. Such a walk through with the voice control system may shorten and/or simplify a thermostat 22 configuration process as opposed to the length of time and difficulty required by following on-screen menus for learning how to configure the thermostat 22 for a specific HVAC system. In one example, a user might initiate the voice control system by stating a trigger phrase (e.g., "Hello, thermostat", etc.) and stating a command ("how to configure thermostat for a humidifier"), in response the voice control system may state "would you like to configure the thermostat to control a humidifier?". If the user responds with "yes", thermostat 22 may correspond with the user 62 in a conversational manner while setting up the thermostat 22 for the HVAC system (e.g., humidifier) based on the user's 62 response to queries from the thermostat 22. Such a technique may eliminate or reduce the need to walk through menu after menu searching for the settings that are typically needed to configure the thermostat 22 and as a result, may reduce configuration time.

The voice control system discussed herein, unless otherwise expressly indicated, may be operated from the voice recognition engine 46 on the thermostat 22, the voice recognition engine 46 on a remote server 58, both of the voice recognition engine 46 on the thermostat 22 and the voice recognition engine 46 the remote server 58, or shared between the voice recognition engine 46 on the thermostat 22 and the voice recognition engine 46 on a remote server 58.

Figure 23:
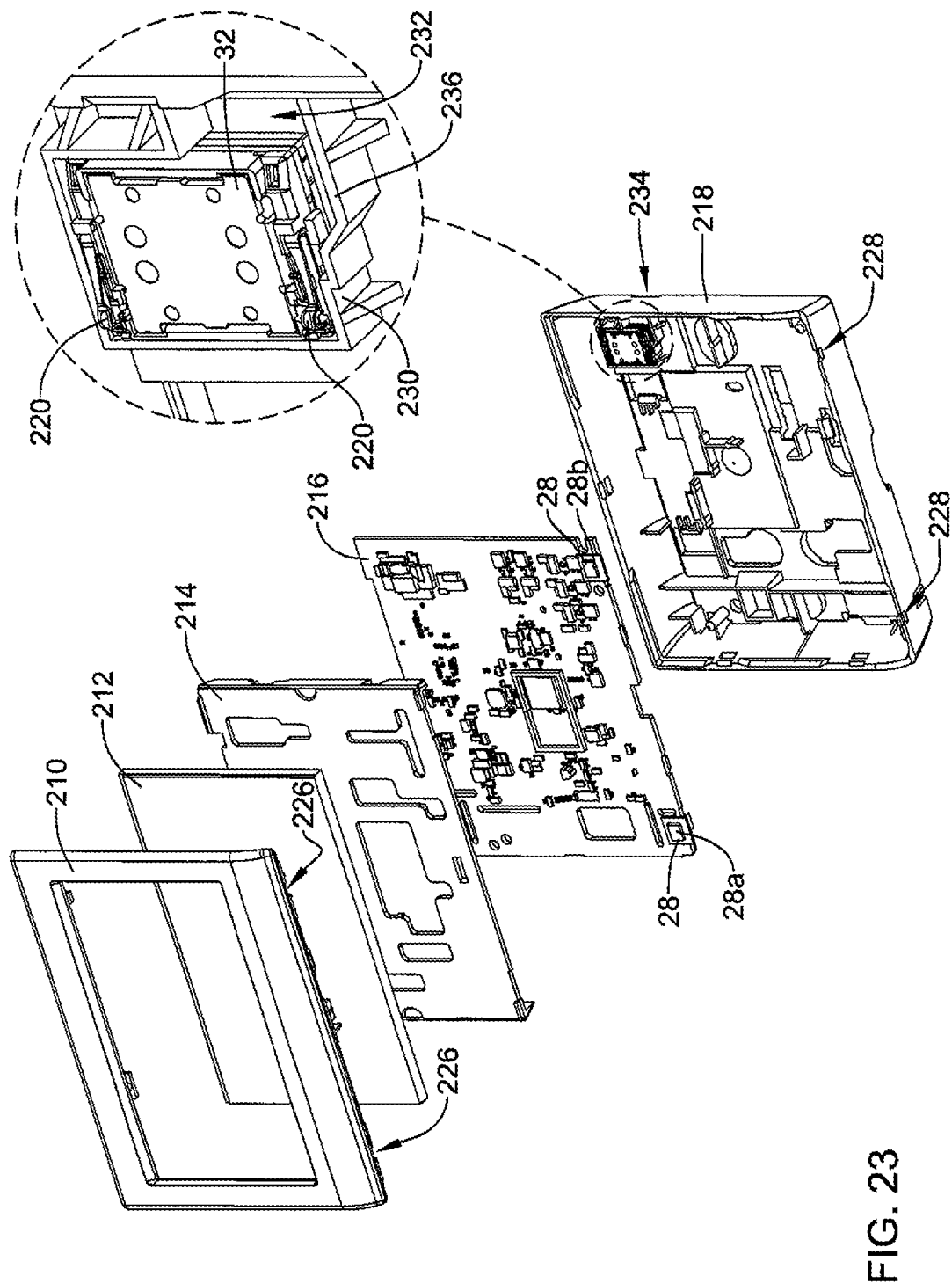
FIG. 23 is an exploded perspective view of an illustrative thermostat that includes one or more microphones and one or more speakers.

FIG. 23 is an exploded perspective view of an illustrative thermostat 22 that may include a front cover 210 (e.g., a front window assembly), a display 212 (e.g., a liquid crystal display (LCD)), a spacer 214, a printed wiring assembly 216, a back cover 218, one or more microphones 28, and one or more speakers 32. In some instances, when included in the thermostat 22, the microphones 28 may be affixed to the printed wiring assembly 216 and may face the front cover 210, and the speakers 32 may be affixed to the back cover 218 and may have electrical contacts 220 that are, or are to be, in electrical communication with electrical contacts 222 on the printed wiring assembly 216. These arrangements of the microphones 28 and the speaker 32 are not required and other arrangements of the microphones 28 and speaker 32 may be utilized, as desired.

An example thermostat 22 structure that may be used and/or combined with the features of this disclosure is disclosed in U.S. Provisional Patent Application Ser. No. 61/800,637, entitled ELECTRONIC DEVICE AND METHODS, filed on Mar. 15, 2013, which is hereby incorporated by reference in its entirety.

Figure 24A:
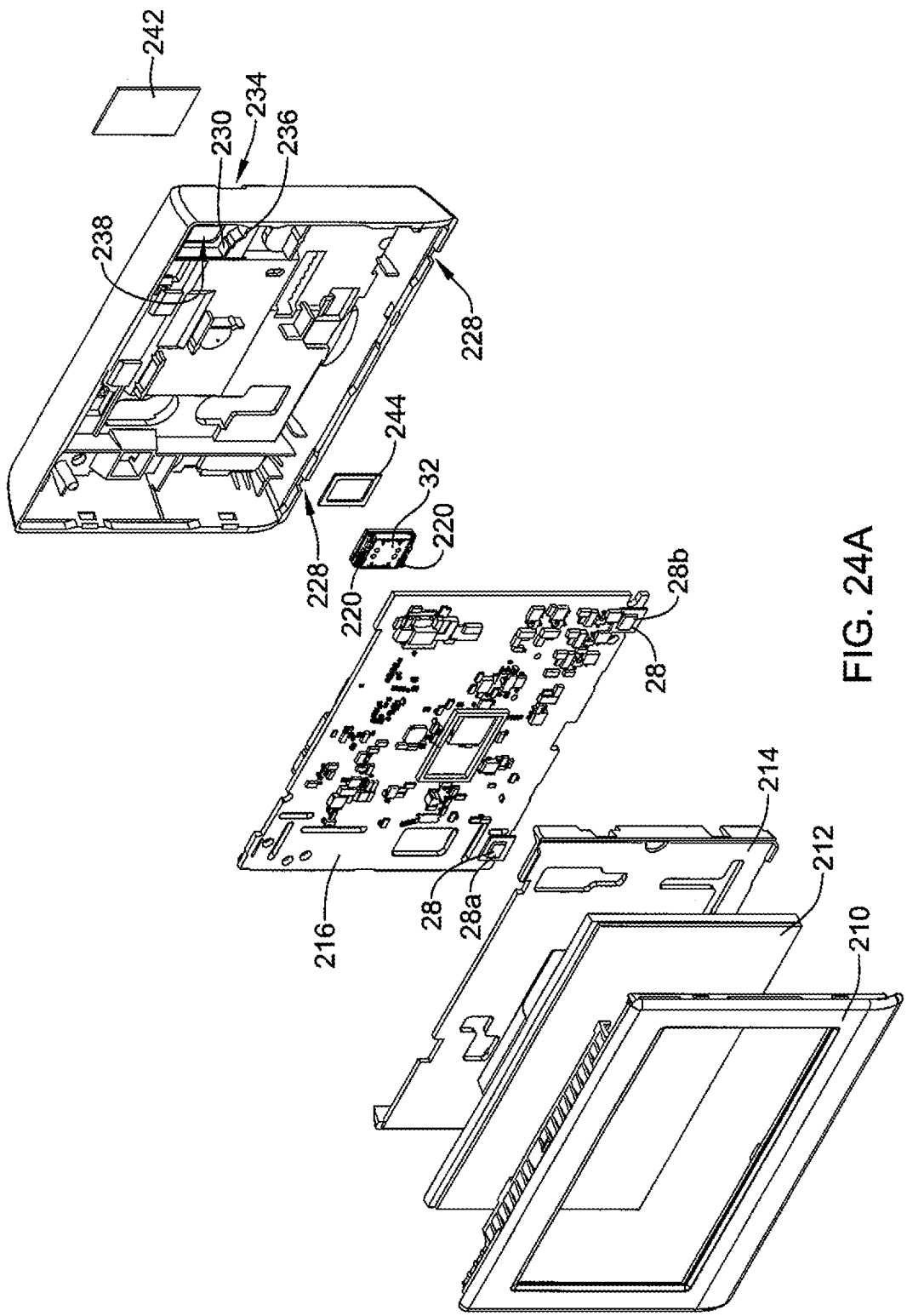
FIG. 24a is an exploded front perspective view of an illustrative thermostat that includes one or more microphones and one or more speakers.

As discussed, the microphones 28 may be positioned on the thermostat 22 at any position, as desired. For example, a first microphone 28*a* may be positioned toward a bottom of the printed wiring assembly 216 and a second microphone 28*b* may be positioned toward the bottom of the printed wiring assembly 216 and spaced from the first microphone 28*a*, as shown in FIGS. 23 and 24A. In some instances, the microphones 28 may be positioned on the printed wiring assembly 216 and/or in the thermostat 22 in a manner that increases the functionality and/or improves the performance of the thermostat 22 and/or the microphones 28. For example, the microphones 28*a* and 28*b* may be separated from one another at the bottom of the printed wiring assembly 216 such that they may be utilized to provide noise cancellation functionality at the thermostat 22 or in the cloud 56, echo cancellation functionality at the thermostat 22 or in the cloud 56, beam forming or spatial filtering functionality (e.g., the ability to determine from which direction a voice is coming and remove unwanted noise) at the thermostat 22 or in the cloud 56, increase the area from which sound may be reliably obtained, and/or increase the functionality and/or improve the performance of the thermostat 22 and/or microphones 28 in any other suitable way. Although other positions of the microphones 28 are not shown in the Figures, the microphones 28 may be positioned in other orientations with respect to one another and/or the printed wiring assembly 216, including, but not limited to, facing different directions, facing each other, being positioned at different heights when the thermostat 22 is upright on a wall, etc.

As mentioned, the microphones 28 may be positioned on the printed wiring assembly 216 such that they face the front cover 210 when the thermostat 22 is assembled. In some instances, the microphones 28 on the printed wiring assembly may align with pockets 224 of the front cover 210 facing the printed wiring assembly 216. These pockets 224 may be configured to abut, or alternatively may be positioned adjacent to, the printed wiring assembly 216 to partially enclose or surround one or more microphones 28 in each pocket 224. In one example, the pockets 224 may enclose and/or surround a majority of the microphone 28 and may have an opening 226 that aligns with an opening 228 of the back cover 218, where the openings 226, 228 lead to an external and/or ambient environment. The openings 226, 228 and the pocket 224 may be configured to receive sound from around the thermostat 22 and funnel that sound to the microphones 28.

FIG. 24A is an exploded front perspective view of the thermostat 22 with the speaker 32 components exploded out of the back cover 218. In some instances, the speaker 32 may be positioned in a speaker compartment 230 of the back cover 218 such that the electrical contacts 220 (e.g., spring contacts (as shown) or other contacts) of the speaker 32 may align with and contact electrical contacts 222 (shown in FIG. 24B) on the printed wiring assembly 216 when the thermostat 22 is connected and/or in operation. In some instances, a gasket 244 may be positioned between the speaker 32 and the speaker compartment 230 to ensure a tight fitting between the speaker 32 and the back cover 218. Illustratively, the speaker 32 may be affixed to the back cover 218 with an adhesive, friction fit, or with any other affixing or connecting mechanism. In some instances, the speaker compartment 230 may form a channel 232 extending from the speaker 32 to an opening 234 in the back cover 218 through which sound from the speaker is heard. The channel 232 may be defined by edges 236 that work to funnel the sound from the speaker 32 to the speaker opening 234 in the back cover 218.

Figure 24B:
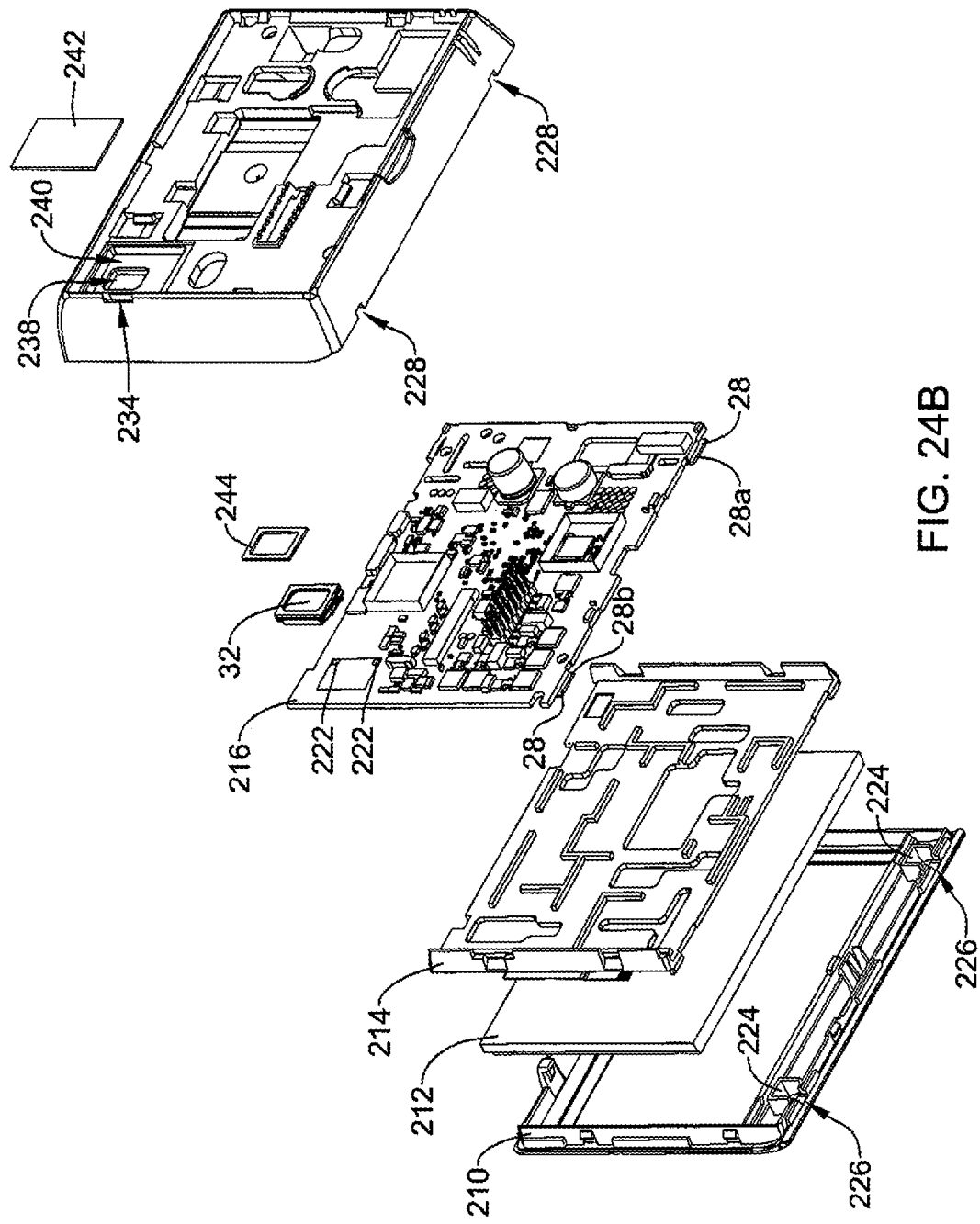
FIG. 24b is an exploded back perspective view of an illustrative thermostat that includes one or more microphones and one or more speakers.

FIG. 24B is an exploded back perspective view of the thermostat 22 with the speaker 32 components exploded out from the back cover 218. In some cases, the speaker 32 may be positioned about a compartment opening 238 in the back cover 218, where the compartment opening 238 leads to a speaker cavity 240 enclosed by a speaker cover 242. The enclosed speaker cavity 240 may be provided for any purpose. For example, the speaker cavity 240 may be provided to improve the sound quality from the speaker 32 that travels through the channel 232 and out the speaker opening 234 in the back cover 218

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method for operating an HVAC control system that is configured to control one or more HVAC components of an HVAC system, the method comprising:
   providing one or more control signals to control one or more HVAC components of the HVAC system in accordance with an HVAC control algorithm;
   receiving via a microphone a first distinct voice stream that includes a predetermined audible trigger followed by a help word or phrase;
   recognizing the predetermined audible trigger and the help word or phrase in the first distinct voice stream; and
   providing one or more natural language audio clips to be played on a speaker for assisting a user in operating the HVAC control system in response to recognizing the predetermined audible trigger and the help word or phrase in the first distinct voice stream.

2. The method of claim 1, further comprising:
   transmitting at least part of the first distinct voice stream to a remote server; and wherein at least part of the recognizing and providing steps are performed by the remote server.

3. The method of claim 1, wherein the one or more control signals are provided by an HVAC control module.

4. The method of claim 3, wherein the receiving step is performed by a remote device that is remote from the HVAC control module.

5. The method of claim 4, wherein the recognizing step is performed at least in part by a remote server that is remote from the remote device.

6. The method of claim 5, wherein the speaker is provided by the remote device.

7. The method of claim 5, wherein the HVAC control module is included in a thermostat, and wherein the speaker is housed by the thermostat.

* * * * *